(12) United States Patent
Bobak et al.

(10) Patent No.: US 9,558,459 B2
(45) Date of Patent: Jan. 31, 2017

(54) DYNAMIC SELECTION OF ACTIONS IN AN INFORMATION TECHNOLOGY ENVIRONMENT

(75) Inventors: Mythili K. Bobak, Lagrangeville, NY (US); Tim A. McConnell, Lexington, KY (US); Michael D. Swanson, Springfield, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1538 days.

(21) Appl. No.: 11/965,951

(22) Filed: Dec. 28, 2007

(65) Prior Publication Data
US 2009/0171733 A1    Jul. 2, 2009

(51) Int. Cl.
G06Q 10/00    (2012.01)
G06Q 10/06    (2012.01)
G06F 9/46     (2006.01)
G06Q 50/18    (2012.01)

(52) U.S. Cl.
CPC .............. *G06Q 10/06* (2013.01); *G06F 9/46* (2013.01); *G06Q 10/063* (2013.01); *G06Q 10/0631* (2013.01); *G06Q 50/188* (2013.01)

(58) Field of Classification Search
CPC .......... G06Q 10/06; G06Q 10/063; G06F 9/46
USPC ....................................................... 705/7.11
See application file for complete search history.

(56) References Cited

U.S. PATENT DOCUMENTS

| | | |
|---|---|---|
| 4,979,105 A | 12/1990 | Daly et al. |
| 5,023,873 A | 6/1991 | Stevenson et al. ............ 371/8.2 |
| 5,386,561 A | 1/1995 | Huynh et al. |
| 5,452,452 A | 9/1995 | Gaetner et al. |
| 5,481,694 A | 1/1996 | Chao et al. .................... 395/439 |
| 5,530,802 A | 6/1996 | Fuchs et al. |
| 5,537,542 A | 7/1996 | Eilert et al. |
| 5,604,863 A | 2/1997 | Allen et al. |
| 5,631,831 A | 5/1997 | Bird et al. |
| 5,652,908 A | 7/1997 | Douglas et al. |
| 5,734,837 A | 3/1998 | Flores et al. |
| 5,790,780 A | 8/1998 | Brichta et al. |
| 5,797,005 A | 8/1998 | Bahls et al. |
| 5,797,129 A | 8/1998 | Rohan |
| 5,826,080 A | 10/1998 | Dworzecki |
| 5,887,168 A | 3/1999 | Bahls et al. |
| 6,012,044 A | 1/2000 | Maggioncalda et al. |
| 6,012,152 A | 1/2000 | Douik et al. |

(Continued)

FOREIGN PATENT DOCUMENTS

WO    WO 99/10814    3/1999    ............ G06F 13/00

OTHER PUBLICATIONS

Office Action for U.S. Appl. No. 11/966,495 dated Oct. 29, 2009.
(Continued)

*Primary Examiner* — Jamie Austin
(74) *Attorney, Agent, or Firm* — Margaret McNamara, Esq.; Blanche E. Schiller, Esq.; Heslin Rothenberg Farley & Mesiti P.C.

(57) ABSTRACT

Management of an Information Technology environment is facilitated by preparing the environment for management. The environment is prepared for a specific management goal, such as an availability goal or a performance goal. To prepare the environment, one or more recommended preparatory actions are selected, initiated and monitored. Resources associated with the actions are also monitored.

20 Claims, 29 Drawing Sheets

(56) References Cited

U.S. PATENT DOCUMENTS

| | | | |
|---|---|---|---|
| 6,041,306 A | 3/2000 | Du et al. | |
| 6,081,826 A | 6/2000 | Masuoka et al. | |
| 6,125,442 A | 9/2000 | Maves et al. | |
| 6,336,138 B1 | 1/2002 | Caswell et al. | |
| 6,385,613 B1 | 5/2002 | Grewell et al. | 707/8 |
| 6,393,386 B1 | 5/2002 | Zager et al. | |
| 6,393,485 B1 | 5/2002 | Chao et al. | 709/231 |
| 6,408,277 B1 | 6/2002 | Nelken | |
| 6,449,688 B1 | 9/2002 | Peters et al. | 711/112 |
| 6,480,944 B2 | 11/2002 | Bradshaw et al. | |
| 6,625,751 B1 | 9/2003 | Starovic et al. | |
| 6,732,118 B2 | 5/2004 | Hermann et al. | |
| 6,785,768 B2 | 8/2004 | Peters et al. | 711/112 |
| 6,862,696 B1 | 3/2005 | Voas et al. | |
| 6,874,010 B1 | 3/2005 | Sargent | |
| 6,934,247 B2 | 8/2005 | Bhattal et al. | 370/216 |
| 6,954,786 B1 | 10/2005 | Vered et al. | |
| 6,983,321 B2 | 1/2006 | Trinon et al. | |
| 6,983,362 B1 | 1/2006 | Kidder et al. | |
| 7,032,186 B1 | 4/2006 | Gasser et al. | |
| 7,039,827 B2 | 5/2006 | Meyer et al. | |
| 7,047,337 B2 | 5/2006 | Armstrong et al. | |
| 7,058,947 B1 | 6/2006 | Raja et al. | |
| 7,111,297 B1 | 9/2006 | Sankaranarayan et al. | |
| 7,162,427 B1* | 1/2007 | Myrick et al. | 705/348 |
| 7,197,749 B2 | 3/2007 | Thornton et al. | |
| 7,243,267 B2 | 7/2007 | Klemm et al. | |
| 7,281,018 B1 | 10/2007 | Begun et al. | |
| 7,313,573 B2 | 12/2007 | Leung et al. | |
| 7,325,161 B1 | 1/2008 | Rakic et al. | |
| 7,389,217 B2* | 6/2008 | Benny et al. | 703/22 |
| 7,389,335 B2 | 6/2008 | MacLeod et al. | |
| 7,395,537 B1 | 7/2008 | Brown et al. | |
| 7,409,356 B1 | 8/2008 | Geddes et al. | |
| 7,437,611 B2 | 10/2008 | Agarwal et al. | |
| 7,463,648 B1 | 12/2008 | Eppstein et al. | |
| 7,490,265 B2 | 2/2009 | Baskey et al. | |
| 7,499,954 B2 | 3/2009 | Cherkauer et al. | |
| 7,509,529 B2 | 3/2009 | Colucci et al. | |
| 7,523,359 B2 | 4/2009 | Richards et al. | |
| 7,529,981 B2 | 5/2009 | Childress et al. | |
| 7,536,585 B1 | 5/2009 | Keeton et al. | |
| 7,568,019 B1 | 7/2009 | Bhargava et al. | |
| 7,571,306 B1* | 8/2009 | Lakshman | 713/1 |
| 7,587,483 B1 | 9/2009 | Florissi et al. | |
| 7,610,512 B2 | 10/2009 | Gerber | |
| 7,620,953 B1 | 11/2009 | Tene et al. | |
| 7,627,728 B1 | 12/2009 | Roeck et al. | |
| 7,650,341 B1 | 1/2010 | Oratovsky et al. | |
| 7,661,033 B2 | 2/2010 | Challener et al. | |
| 7,707,173 B2 | 4/2010 | Nanavati et al. | |
| 7,707,451 B2 | 4/2010 | Buskens et al. | |
| 7,730,363 B2 | 6/2010 | Takezawa et al. | |
| 7,743,001 B1 | 6/2010 | Vermeulen et al. | |
| 7,747,730 B1 | 6/2010 | Harlow | |
| 7,752,310 B2 | 7/2010 | Kageyama | |
| 7,774,457 B1 | 8/2010 | Talwar et al. | |
| 7,774,458 B2 | 8/2010 | Trinon et al. | |
| 7,818,421 B2 | 10/2010 | Machida | |
| 7,865,582 B2 | 1/2011 | Santos et al. | |
| 7,917,814 B2 | 3/2011 | Hu et al. | |
| 7,933,872 B2 | 4/2011 | Kulkarni et al. | |
| 7,934,119 B2 | 4/2011 | Takamoto et al. | |
| 7,937,706 B2 | 5/2011 | Casotto | |
| 7,958,393 B2 | 6/2011 | Bobak et al. | |
| 7,962,590 B1 | 6/2011 | Or et al. | |
| 8,051,106 B2 | 11/2011 | Bird | |
| 8,065,554 B2 | 11/2011 | Herscovitz et al. | |
| 8,086,758 B1 | 12/2011 | Allan et al. | |
| 8,260,893 B1 | 9/2012 | Bandhole et al. | |
| 2001/0056398 A1 | 12/2001 | Scheirer | |
| 2001/0056554 A1 | 12/2001 | Chrabaszcz | |
| 2002/0022952 A1 | 2/2002 | Zager et al. | |
| 2002/0049749 A1 | 4/2002 | Helgeson et al. | |
| 2002/0059512 A1* | 5/2002 | Desjardins | G06Q 10/10 713/1 |
| 2002/0069102 A1 | 6/2002 | Vellante et al. | |
| 2002/0078130 A1 | 6/2002 | Thornton et al. | |
| 2002/0078381 A1 | 6/2002 | Farley et al. | |
| 2002/0091991 A1 | 7/2002 | Castro | |
| 2002/0188485 A1* | 12/2002 | Benny et al. | 705/7 |
| 2002/0194045 A1 | 12/2002 | Shay et al. | |
| 2002/0198727 A1 | 12/2002 | Ann et al. | |
| 2003/0051186 A1 | 3/2003 | Boudnik et al. | |
| 2003/0056013 A1 | 3/2003 | Laschkewitsch et al. | |
| 2003/0078823 A1 | 4/2003 | Yoshioka et al. | |
| 2003/0084100 A1 | 5/2003 | Gahan et al. | |
| 2003/0093672 A1 | 5/2003 | Cichowlas | |
| 2003/0135384 A1 | 7/2003 | Nguyen | |
| 2003/0135609 A1 | 7/2003 | Carlson et al. | |
| 2003/0139956 A1 | 7/2003 | Guenther et al. | |
| 2003/0200482 A1 | 10/2003 | Sullivan | |
| 2003/0212580 A1 | 11/2003 | Shen | |
| 2003/0212685 A1 | 11/2003 | Rakotoarivelo et al. | |
| 2003/0225602 A1 | 12/2003 | Hagmann et al. | |
| 2003/0236677 A1 | 12/2003 | Casati et al. | |
| 2004/0034553 A1 | 2/2004 | Cole et al. | |
| 2004/0054690 A1 | 3/2004 | Hillerbrand et al. | |
| 2004/0078373 A1 | 4/2004 | Ghoneimy et al. | |
| 2004/0111702 A1 | 6/2004 | Chan | |
| 2004/0119752 A1 | 6/2004 | Beringer et al. | |
| 2004/0143470 A1 | 7/2004 | Myrick et al. | |
| 2004/0158777 A1 | 8/2004 | Bae et al. | 714/47 |
| 2004/0162741 A1 | 8/2004 | Flaxer et al. | |
| 2004/0181476 A1 | 9/2004 | Smith et al. | |
| 2004/0186905 A1 | 9/2004 | Young et al. | |
| 2004/0193476 A1 | 9/2004 | Aerdts | |
| 2004/0199768 A1 | 10/2004 | Nail | |
| 2004/0210452 A1 | 10/2004 | Aboujaoude et al. | |
| 2004/0243699 A1 | 12/2004 | Koclanes et al. | |
| 2005/0015641 A1 | 1/2005 | Alur et al. | |
| 2005/0027835 A1 | 2/2005 | Raikar et al. | |
| 2005/0033600 A1 | 2/2005 | Geddes et al. | |
| 2005/0043977 A1 | 2/2005 | Ahern et al. | |
| 2005/0049906 A1 | 3/2005 | Leymann et al. | |
| 2005/0060662 A1 | 3/2005 | Soares et al. | |
| 2005/0071470 A1 | 3/2005 | O'Brien et al. | |
| 2005/0086091 A1 | 4/2005 | Trumbly et al. | |
| 2005/0091351 A1* | 4/2005 | Badovinatz | G06F 9/5061 709/223 |
| 2005/0096949 A1 | 5/2005 | Aiber et al. | |
| 2005/0119905 A1 | 6/2005 | Wong et al. | |
| 2005/0125768 A1 | 6/2005 | Wong et al. | |
| 2005/0172306 A1 | 8/2005 | Agarwal et al. | |
| 2005/0177406 A1 | 8/2005 | Facciorusso et al. | |
| 2005/0198244 A1 | 9/2005 | Eilam et al. | |
| 2005/0228707 A1 | 10/2005 | Hendrickson | |
| 2005/0228852 A1 | 10/2005 | Santos et al. | |
| 2005/0228878 A1* | 10/2005 | Anstey | H04L 43/16 709/224 |
| 2005/0235248 A1 | 10/2005 | Victoria et al. | |
| 2005/0262242 A1 | 11/2005 | Byers et al. | |
| 2006/0004265 A1 | 1/2006 | Pulkkinen et al. | |
| 2006/0010234 A1 | 1/2006 | Reedy et al. | |
| 2006/0020866 A1 | 1/2006 | Lo et al. | |
| 2006/0037022 A1 | 2/2006 | Byrd et al. | |
| 2006/0041505 A1 | 2/2006 | Enyart | |
| 2006/0064335 A1 | 3/2006 | Goldszmidt et al. | |
| 2006/0074731 A1 | 4/2006 | Green et al. | |
| 2006/0074736 A1 | 4/2006 | Shukla et al. | |
| 2006/0074993 A1 | 4/2006 | Pulamarasetti et al. | |
| 2006/0106626 A1 | 5/2006 | Jeng et al. | |
| 2006/0111921 A1 | 5/2006 | Chang et al. | |
| 2006/0112383 A1 | 5/2006 | Chang et al. | |
| 2006/0117221 A1 | 6/2006 | Fisher et al. | |
| 2006/0123022 A1 | 6/2006 | Bird | |
| 2006/0129562 A1 | 6/2006 | Pulamarasetti et al. | |
| 2006/0149842 A1 | 7/2006 | Dawson et al. | |
| 2006/0161444 A1* | 7/2006 | Lubrecht | G06F 8/00 705/7.41 |
| 2006/0161466 A1 | 7/2006 | Trinon et al. | |
| 2006/0161883 A1* | 7/2006 | Lubrecht | G06Q 10/06 717/104 |

(56) References Cited

U.S. PATENT DOCUMENTS

| | | |
|---|---|---|
| 2006/0179136 A1 | 8/2006 | Loboz et al. |
| 2006/0190368 A1 | 8/2006 | Kesterman |
| 2006/0190583 A1 | 8/2006 | Whalen |
| 2006/0190775 A1 | 8/2006 | Aggarwal et al. |
| 2006/0218558 A1 | 9/2006 | Torii et al. |
| 2006/0224702 A1 | 10/2006 | Schmidt et al. |
| 2006/0236061 A1 | 10/2006 | Koclanes |
| 2006/0245354 A1 | 11/2006 | Gao et al. |
| 2006/0245369 A1 | 11/2006 | Schimmelpfeng et al. |
| 2006/0248546 A1 | 11/2006 | Andreev et al. |
| 2006/0259526 A1 | 11/2006 | Booz et al. |
| 2006/0287875 A1 | 12/2006 | Reddy et al. |
| 2006/0293942 A1 | 12/2006 | Chaddha et al. |
| 2007/0011331 A1 | 1/2007 | Morimotto et al. |
| 2007/0027734 A1 | 2/2007 | Hughes |
| 2007/0038490 A1 | 2/2007 | Joodi |
| 2007/0038492 A1 | 2/2007 | Ryan et al. |
| 2007/0061385 A1 | 3/2007 | Clark et al. |
| 2007/0067296 A1 | 3/2007 | Malloy et al. |
| 2007/0079097 A1 | 4/2007 | Karnowski et al. |
| 2007/0100712 A1 | 5/2007 | Kilpatrick et al. |
| 2007/0112847 A1 | 5/2007 | Dublish et al. |
| 2007/0143166 A1 | 6/2007 | Leymann et al. |
| 2007/0150571 A1 | 6/2007 | Haga et al. |
| 2007/0165525 A1 | 7/2007 | Kageyama |
| 2007/0179826 A1 | 8/2007 | Cutlip et al. |
| 2007/0198678 A1 | 8/2007 | Dieberger et al. |
| 2007/0198789 A1 | 8/2007 | Clark et al. |
| 2007/0234408 A1 | 10/2007 | Burch et al. |
| 2007/0266029 A1 | 11/2007 | Baskey et al. |
| 2007/0271219 A1 | 11/2007 | Agarwal et al. |
| 2007/0276885 A1 | 11/2007 | Valiyaparambil et al. |
| 2007/0283016 A1* | 12/2007 | Pendarakis ............ H04L 12/66 709/226 |
| 2007/0286219 A1 | 12/2007 | Knop et al. |
| 2007/0294406 A1 | 12/2007 | Suer et al. |
| 2007/0300204 A1 | 12/2007 | Andreev et al. |
| 2008/0005739 A1 | 1/2008 | Sadiq et al. |
| 2008/0016335 A1 | 1/2008 | Takahashi et al. |
| 2008/0052719 A1 | 2/2008 | Briscoe et al. |
| 2008/0063423 A1 | 3/2008 | Matoba |
| 2008/0140495 A1 | 6/2008 | Bhamidipaty et al. |
| 2008/0147452 A1 | 6/2008 | Renz et al. |
| 2008/0215909 A1 | 9/2008 | Bretschneider et al. |
| 2008/0294777 A1 | 11/2008 | Karve et al. |
| 2008/0295100 A1 | 11/2008 | Ainsworth |
| 2008/0317217 A1 | 12/2008 | Bernardini et al. |
| 2009/0037363 A1 | 2/2009 | Kozlov et al. |
| 2009/0077210 A1 | 3/2009 | Musman et al. |
| 2009/0113383 A1 | 4/2009 | Delima et al. |
| 2009/0125751 A1 | 5/2009 | Dawson et al. |
| 2009/0150456 A1 | 6/2009 | Balasubramanian et al. |
| 2009/0150887 A1 | 6/2009 | Sanghvi et al. |
| 2009/0171703 A1 | 7/2009 | Bobak et al. |
| 2009/0171704 A1 | 7/2009 | Bobak et al. |
| 2009/0171705 A1 | 7/2009 | Bobak et al. |
| 2009/0171706 A1 | 7/2009 | Bobak et al. |
| 2009/0171707 A1 | 7/2009 | Bobak et al. |
| 2009/0171708 A1 | 7/2009 | Bobak et al. |
| 2009/0171730 A1 | 7/2009 | Bobak et al. |
| 2009/0171731 A1 | 7/2009 | Bobak et al. |
| 2009/0171732 A1 | 7/2009 | Bobak et al. |
| 2009/0172149 A1 | 7/2009 | Bobak et al. |
| 2009/0172460 A1 | 7/2009 | Bobak et al. |
| 2009/0172461 A1 | 7/2009 | Bobak et al. |
| 2009/0172470 A1 | 7/2009 | Bobak et al. |
| 2009/0172668 A1 | 7/2009 | Bobak et al. |
| 2009/0172669 A1 | 7/2009 | Bobak et al. |
| 2009/0172670 A1 | 7/2009 | Bobak et al. |
| 2009/0172671 A1 | 7/2009 | Bobak et al. |
| 2009/0172674 A1 | 7/2009 | Bobak et al. |
| 2009/0172682 A1 | 7/2009 | Bobak et al. |
| 2009/0172687 A1 | 7/2009 | Bobak et al. |
| 2009/0172688 A1 | 7/2009 | Bobak et al. |
| 2009/0172689 A1 | 7/2009 | Bobak et al. |
| 2009/0172769 A1 | 7/2009 | Bobak et al. |
| 2009/0249337 A1 | 10/2009 | Vasilevsky et al. |
| 2010/0280863 A1 | 11/2010 | Wilcock et al. |
| 2011/0004564 A1 | 1/2011 | Rolia et al. |

OTHER PUBLICATIONS

Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Office Action for U.S. Appl. No. 11/966,619 dated Feb. 2, 2011.
Office Action for U.S. Appl. No. 11/965,926 dated Feb. 3, 2011.
Buchanan, Richard D., et al., "Aligning Enterprise and IT Investments with Corporate Goals," OMG White Paper, 2002, p. 1-13.
Restriction Requirement for U.S. Appl. No. 11/965,889 dated Feb. 16, 2011.
Office Action for U.S. Appl. No. 11/965,913 dated Mar. 1, 2011.
Rood, Melody A., "Enterprise Architecture: Definition, Content & Utility," IEEE, Jul. 1994, pp. 106-111.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339.
Office Action for U.S. Appl. No. 11/965,922 dated Mar. 16, 2011.
Office Action for U.S. Appl. No. 11/965,832 dated May 12, 2011.
Office Action for U.S. Appl. No. 11/965,851 dated May 20, 2011.
Final Office Action for U.S. Appl. No. 11/965,897 dated Sep. 17, 2010.
"BPEL Project", http://www.eclipse.org/bpel/.
"Factor Analysis Using SAS PROC FACTOR", http://www.utexas.edu/cc/docs/stat53.html.
"Principal Components and Factor Analysis", http://statsoft.com/textbook/stfacan.html.
"WebSphere Intergration Developer", http://www-306.ibm.com/software/integration/wid/about/?S_CMP=rnav.
Final Office Action for U.S. Appl. No. 11/965,930 dated Sep. 29, 2010.
Final Office Action for U.S. Appl. No. 11/965,874 dated Oct. 14, 2010.
Office Action for U.S. Appl. No. 11/965,862 dated Dec. 7, 2010.
Final Office Action for U.S. Appl. No. 11/965,855 dated Dec. 22, 2010.
Office Action for U.S. Appl. No. 11/965,832 dated Dec. 22, 2010.
Final Office Action for U.S. Appl. No. 11/965,872 dated Dec. 22, 2010.
U.S. Appl. No. 12/975,520, filed Dec. 22, 2010 entitled "Real-Time Information Technology Environments".
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 0672324083; pp. 54-64.
Office Action for U.S. Appl. No. 11/965,862 dated Jun. 23, 2010.
Final Office Action for U.S. Appl. No. 11/966,495 dated Jun. 14, 2010.
Office Action for U.S. Appl. No. 11/965,872 dated Jul. 6, 2010.

(56) References Cited

OTHER PUBLICATIONS

Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—vol. II—Advanced Features (7th Edition), Sun Microsystems Press, 2005, ISBN 0131118269, Chapter 1 (pp. 1-22).
"Parasoft BPEL Maestro," hftp://www.parasoft.com/jsp/products/home.jsp?product=BPEL.
Office Action for U.S. Appl. No. 11/965,855 dated Apr. 30, 2010.
Final Office Action for U.S. Appl. No. 11/966,495 dated May 14, 2010.
Office Action for U.S. Appl. No. 11/965,978 dated Jun. 22, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Final Office Action for U.S. Appl. No. 11/965,926 dated Jul. 19, 2011.
Final Office Action for U.S. Appl. No. 11/965,922 dated Jul. 29, 2011.
Office Action for U.S. Appl. No. 11/965,845 dated Jul. 29, 2011.
Office Action for U.S. Appl. No. 11/965,832 dated Aug. 23, 2011.
Office Action for U.S. Appl. No. 11/965,902 dated Aug. 23, 2011.
Final Office Action for U.S. Appl. No. 11/965,838 dated Aug. 19, 2011.
Final Office Action for U.S. Appl. No. 11/965,913 dated Aug. 17, 2011.
Office Action for U.S. Appl. No. 11/965,894 dated Jul. 18, 2011.
Office Action for U.S. Appl. No. 11/965,855 dated Oct. 3, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Notice of Allowance for U.S. Appl. No. 11/965,894 dated Nov. 7, 2013, pp. 1-16.
Final Office Action for U.S. Appl. No. 11/965,922 dated Dec. 27, 2013, pp. 1-65.
Charfi, Anis and Mira Mezini, "Aspect-Oriented Workflow Languages," Oct. 2006, pp. 183-200.
Charfi, Anis and Mira Mezini, "Aspect-Oriented Web Service Composition with AO4BPEL," 2004 (no further date information available), pp. 168-182.
Lassen, Kristian Bisgaard and Wil M.P. van der Aalst, "WorkflowNet2BPEL4WS: A Tool for Translating Unstructured Workflow Processes to Readable BPEL," Oct. 2006, pp. 127-144.
Karastoyanova, Dimka et al., "Extending BPEL for Run Time Adaptability," Sep. 2005, pp. 15-26.
Mayer, Philip and Daniel Lubke, "Towards a BPEL Unit Testing Framework," Jul. 2006, pp. 33-42.
Notice of Allowance for U.S. Appl. No. 11/965,926 dated Dec. 31, 2013, pp. 1-28.
Notice of Allowance for U.S. Appl. No. 11/965,845 dated Dec. 31, 2013, pp. 1-28.
Notice of Allowance for U.S. Appl. No. 12/975,520 dated Jan. 17, 2014, pp. 1-19.
Final Office Action for U.S. Appl. No. 11/965,832 dated Jan. 9, 2012.
Final Office Action for U.S. Appl. No. 11/965,889 dated Jan. 11, 2012.
Office Action for U.S. Appl. No. 11/966,495 dated Feb. 1, 2012.
Final Office Action for U.S. Appl. No. 11/965,862 dated Feb. 14, 2012.
Office Action for U.S. Appl. No. 11/965,872 dated Feb. 16, 2012.
Office Action for U.S. Appl. No. 11/965,926 dated Mar. 2, 2012.
Office Action for U.S. Appl. No. 11/965,874 dated Mar. 19, 2012.
Office Action for U.S. Appl. No. 11/965,845 dated Apr. 18, 2012.
Office Action for U.S. Appl. No. 11/965,922 dated Apr. 20, 2012.
Crawford et al., "Toward an on Demand Service-Oriented Architecture," IBM Systems Journal, vol. 44, No. 1, 2005.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Office Action for U.S. Appl. No. 12/975,520 dated Jul. 18, 2012.
Final Office Action for U.S. Appl. No. 11/965,906 dated Jul. 23, 2012.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.
Office Action for U.S. Appl. No. 11/965,902 dated Nov. 16, 2012.
Final Office Action for U.S. Appl. No. 11/965,838 dated Aug. 9, 2013, pp. 1-19.
Office Action for U.S. Appl. No. 11/965,845 dated Aug. 13, 2013, pp. 1-46.
Office Action for U.S. Appl. No. 11/9654,926 dated Aug. 14, 2013, pp. 1-29.
Office Action for U.S. Appl. No. 11/965,922 dated Aug. 14, 2013, pp. 1-35.
Office Action for U.S. Appl. No. 11/965,899 dated Aug. 28, 2013, pp. 1-20.
Notice of Allowance for U.S. Appl. No. 11/965,917 dated Aug. 28, 2013, pp. 1-25.
Notice of Allowance for U.S. Appl. No. 11/965,862 dated Sep. 16, 2013, pp. 1-15.
Hunter, Erwin L., "Recovery from Software Faults in the EWSD Digital Switching System," IEEE International Conference on Communications, May 1994, pp. 1784-1788.
Final Office Action for U.S. Appl. No. 11/965,889 dated Jan. 11, 2013, pp. 1-15.
Final Office Action for U.S. Appl. No. 11/965,899 dated Jan. 29, 2013, pp. 1-17.
Final Office Action for U.S. Appl. No. 11/965,862 dated Apr. 4, 2013, pp. 1-19.
Office Action for U.S. Appl. No. 11/965,838 dated Apr. 30, 2013, pp. 1-30.
Office Action for U.S. Appl. No. 11/965,894 dated May 8, 2013, pp. 1-9.
Office Action for U.S. Appl. No. 11/965,913 dated Jun. 20, 2014, 24 pages.
Office Action for U.S. Appl. No. 11/965,832 dated Jul. 17, 2014, 28 pages.
Office Action for U.S. Appl. No. 11/965,889 dated Jan. 20, 2015, pp. 1-22.

\* cited by examiner

| MESSAGE | RESOURCE | DATE |
|---|---|---|
| i CONTAINMENT REGION HAS RECOVERED | CONTAINMENT1 | APR 18, 2006 10:50:52.193 |
| X CONTAINMENT REGION CREATED FOR RESOURCE FAILURE | CONTAINMENT1 | APR 18, 2006 10:50:52.103 |
| i CONTAINMENT REGION HAS RECOVERED | CONTAINMENT3 | APR 18, 2006 10:50:51.982 |
| X DETECTED DYNAMIC MEMBERSHIP CHANGE: ACTIVE POLICY RED... | RECOVERYSEGMENT2 | APR 18, 2006 10:12:25.696 |
| X THIS RESOURCE HAS ENTERED AN UNRECOVERABLE STATE AND RED... | RECOVERY MANAGER2 | APR 18, 2006 10:12:25.696 |
| X THIS RESOURCE HAS ENTERED AN UNRECOVERABLE STATE AND RED... | RECOVERY MANAGER1 | APR 18, 2006 10:12:14.770 |
| X ACTIVATION OF POLICY "XYZ" HAS FAILED | RECOVERY SEGMENT1 | APR 18, 2006 10:12:14.760 |
| i DETECTED DYNAMIC MEMBERSHIP CHANGE ACTIVE POLICY RED... | RECOVERY SEGMENT2 | APR 18, 2006 10:10:25.696 |

*FIG. 6A*

THE RESOURCE "COHER I RECOVERY" HAS ENTERED AN UNRECOVERABLE STATE THAT REQUIRES YOUR INPUT. DO YOU WANT TO OPEN THE RESOURCE NOW?

YES   NO

DYNAMIC SELECTION OF ACTIONS IN AN INFORMATION TECHNOLOGY ENVIRONMENT

TECHNICAL FIELD

This invention relates, in general, to facilitating management of customer environments to provide support for business resiliency, and in particular, to preparing the environment for management by recommending preparatory actions to be taken, based on the current state of the environment

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the hand-crafted recovery scheme.

SUMMARY OF THE INVENTION

Based on the foregoing, a need exists for a capability to facilitate management of an IT environment. In particular, a need exists for a capability that aids in preparing the environment for management. In one example, a need exists for a technique to programmatically select, based on the current state of the environment, one or more preparatory actions recommended for the environment. A further need exists for a technique to initiate the selected actions and monitor the prepared state of the resources associated with the actions.

The shortcomings of the prior art are overcome and additional advantages are provided through the provision of a computer-implemented method to facilitate management of an IT environment. The method includes, for instance, determining a current state of one or more resources of the IT environment; and programmatically selecting, based on the current state, one or more preparatory actions to be recommended for the IT environment.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

DETAILED DESCRIPTION OF THE INVENTION

Figure 1:
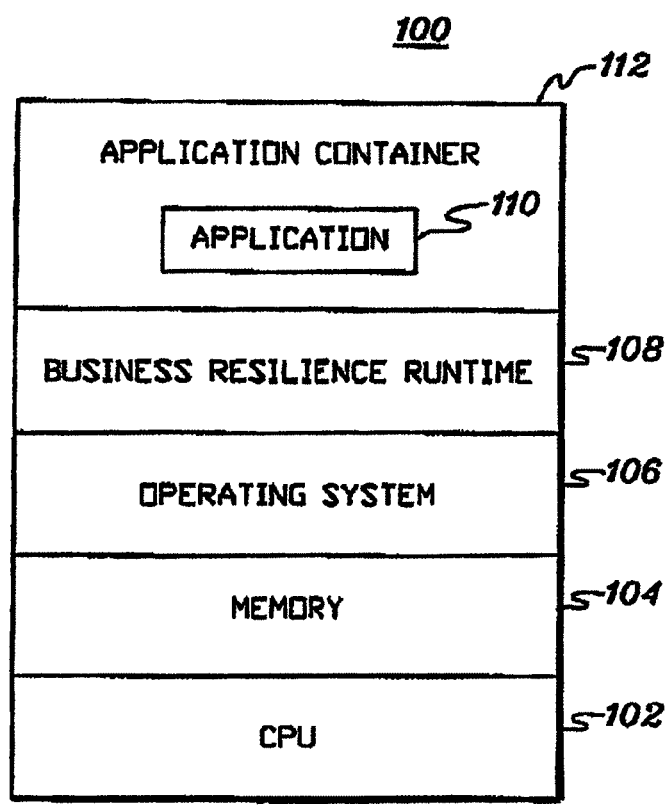
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are preconfigured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:

What is my expected recovery time for a given application during "end of month close" system environment?

What is the longest component of that recovery time?

Can I expect to achieve the desired RTO during the "market open" for stock exchange or financial services applications?

What would be the optimal sequence and parallelization of recovery for the resources used by my business application?

17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?
18. Ability to incorporate operations from any vendors' resources for pre-conditioning or recovery workflows, including specification of which pre-conditioning operations have effect on recoveries, which operations have dependencies on others, either within vendor resources or across resources from multiple vendors.
19. Customer ability to modify pre-conditioning workflows, consistent with supported operations on resources.
20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.
21. Ability to divide pre-conditioning work between long running and immediate, nondisruptive short term actions.
22. Impact only the smallest set of resources required during recovery, to avoid negative residual or side effects for attempting to recover a broader set of resources than what is actually impacted by the failure.
23. Choosing recovery operations based on determination of which recovery actions address the minimal impact, to meet goal, and then prepare for subsequent escalation in event of failure of initial recovery actions.
24. Choosing a target for applications and operating systems (OS), based on customer co-location specifications, redundancy groups, and realtime system state.
25. Ability for customer to indicate specific effect that recovery of a given business process can have on another business process—to avoid situations where lower priority workloads are recovered causing disruption to higher priority workloads; handling situations where resources are shared.
26. Ability to prioritize ongoing recovery processing over configuration changes to an availability system, and over any other administration functions required for the availability system.
27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).
28. Allow for possible non-responsive resources or underlying infrastructure that does not have known maximum delays in response time in determining recovery actions, while not going beyond the allotted recovery time.
29. Allow customer to change quantified business recovery goals/targets without disruption to the existing recovery capability, with appropriate labeling of version of the policy to facilitate interaction with change management systems.
30. Allow customers to change logical groupings of resources that have assigned recovery goals, without disruption to the existing recovery capability, with changes versioned to facilitate interaction with change management systems.
31. Ability to specify customizable human tasks, with time specifications that can be incorporated into the goal achievement validation so customers can understand the full time involved for a recovery and where focusing on IT and people time is critical to reducing RTO.
32. There is a requirement/desire to implement dynamically modified redundancy groupings for those resources which are high volume—automatic inclusion based on a specified set of characteristics and a matching criteria.
33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
    Correlation and identification of dependencies between business functions and the supporting IT resources.
    Impact analysis of failures affecting business functions, across resources used within the business functions, including the applications and data.
    Isolation of failure scope to smallest set of resources, to ensure that any disruptive recovery actions effect only the necessary resources.
2. Rapid granular and graceful degradation of IT service.
    Discontinuation of services based on business priorities.
    Selection of alternate resources at various levels may include selection of hardware, application software, data, etc.
    Notifications to allow applications to tailor or reduce service consumption during times of availability constraints.
3. Integration of availability management with normal business operations and other core business processes.
    Policy controls for availability and planned reconfiguration, aligned with business objectives.
    Encapsulation, integration of isolated point solutions into availability IT fabric, through identification of affected resources and operations initiated by the solutions, as well as business resiliency.
    Goal based policy support, associated with Recovery Segments that may be overlapped or nested in scope.
    Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System Z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
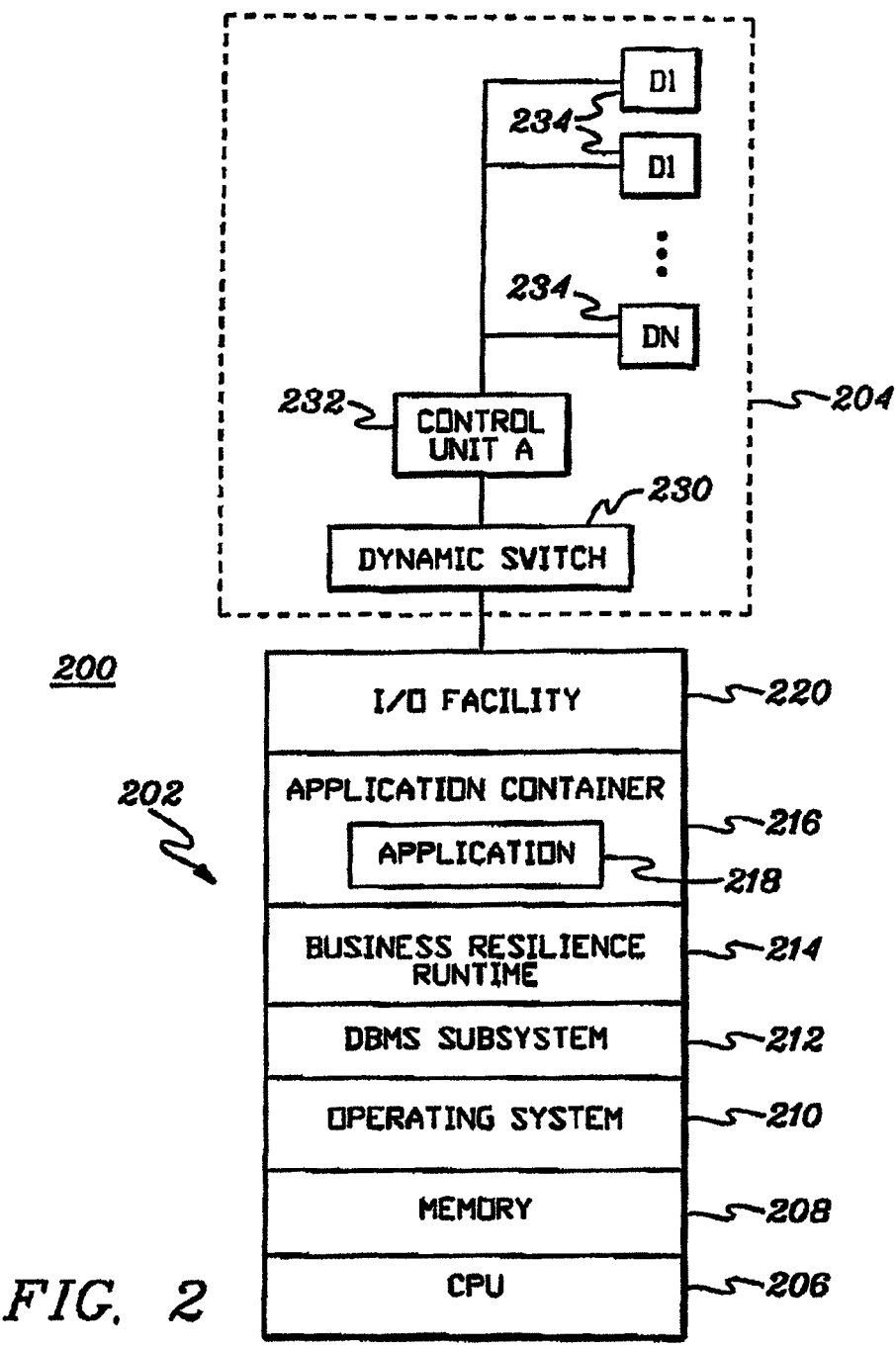
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
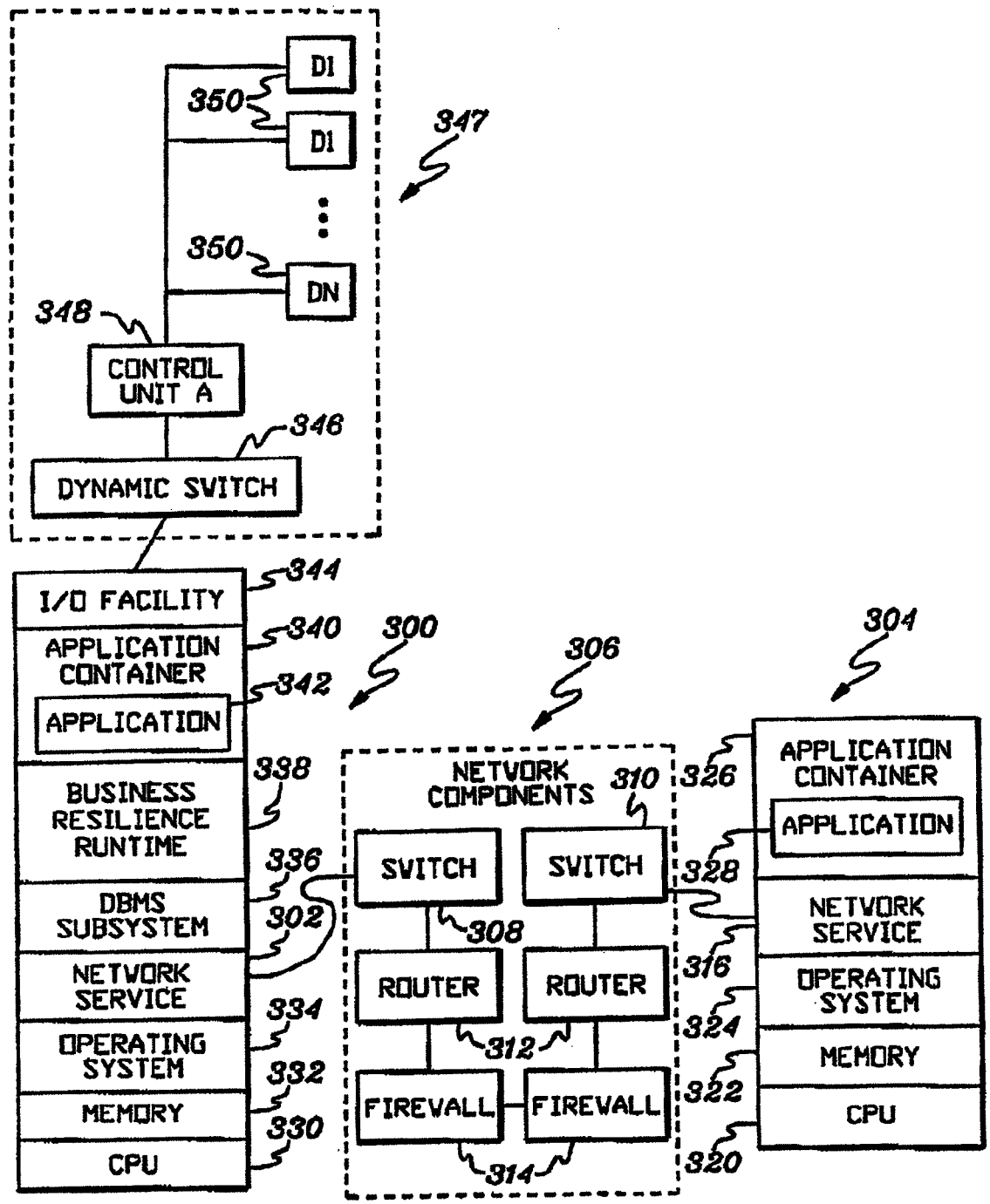
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
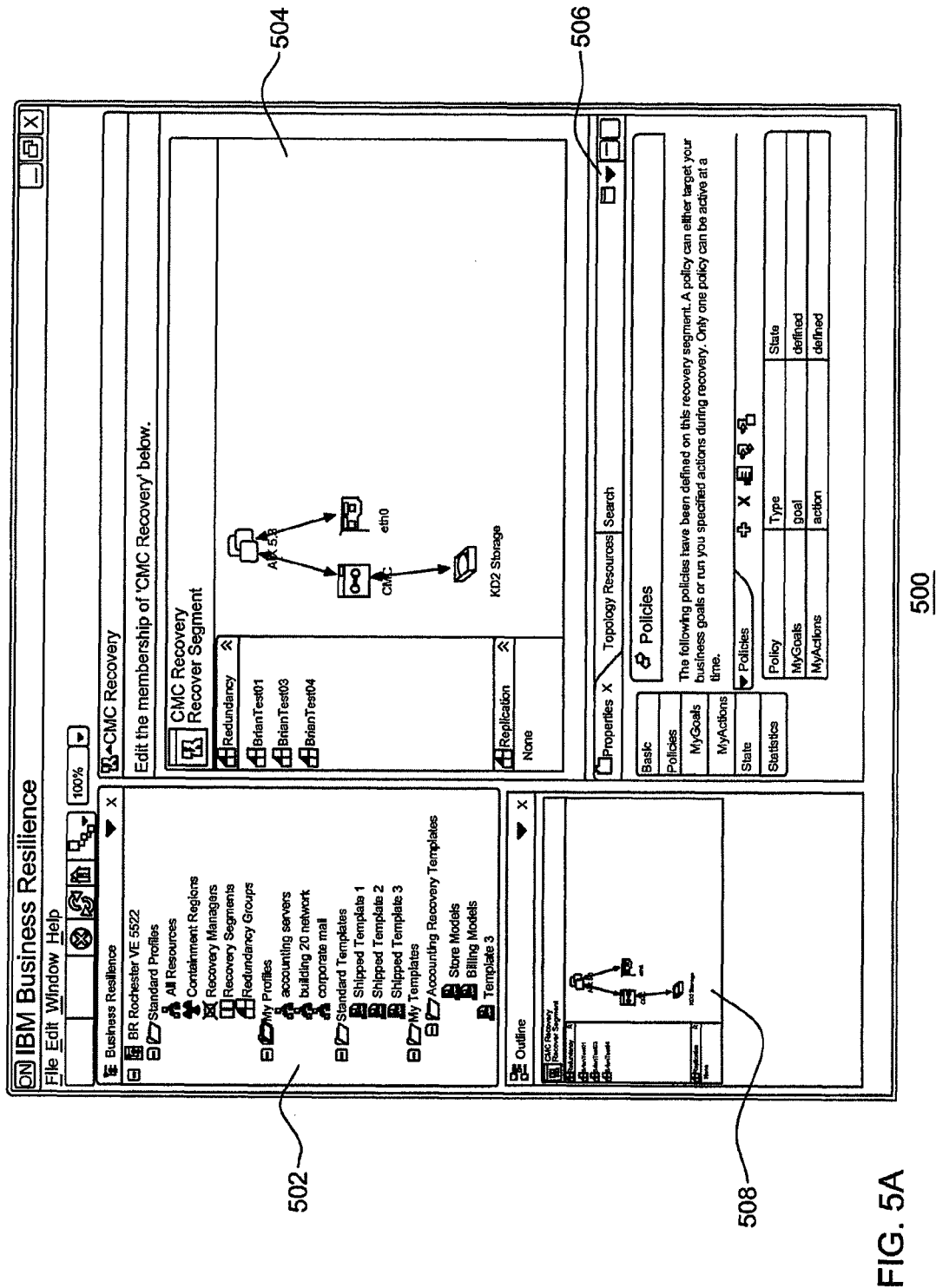
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View 506

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
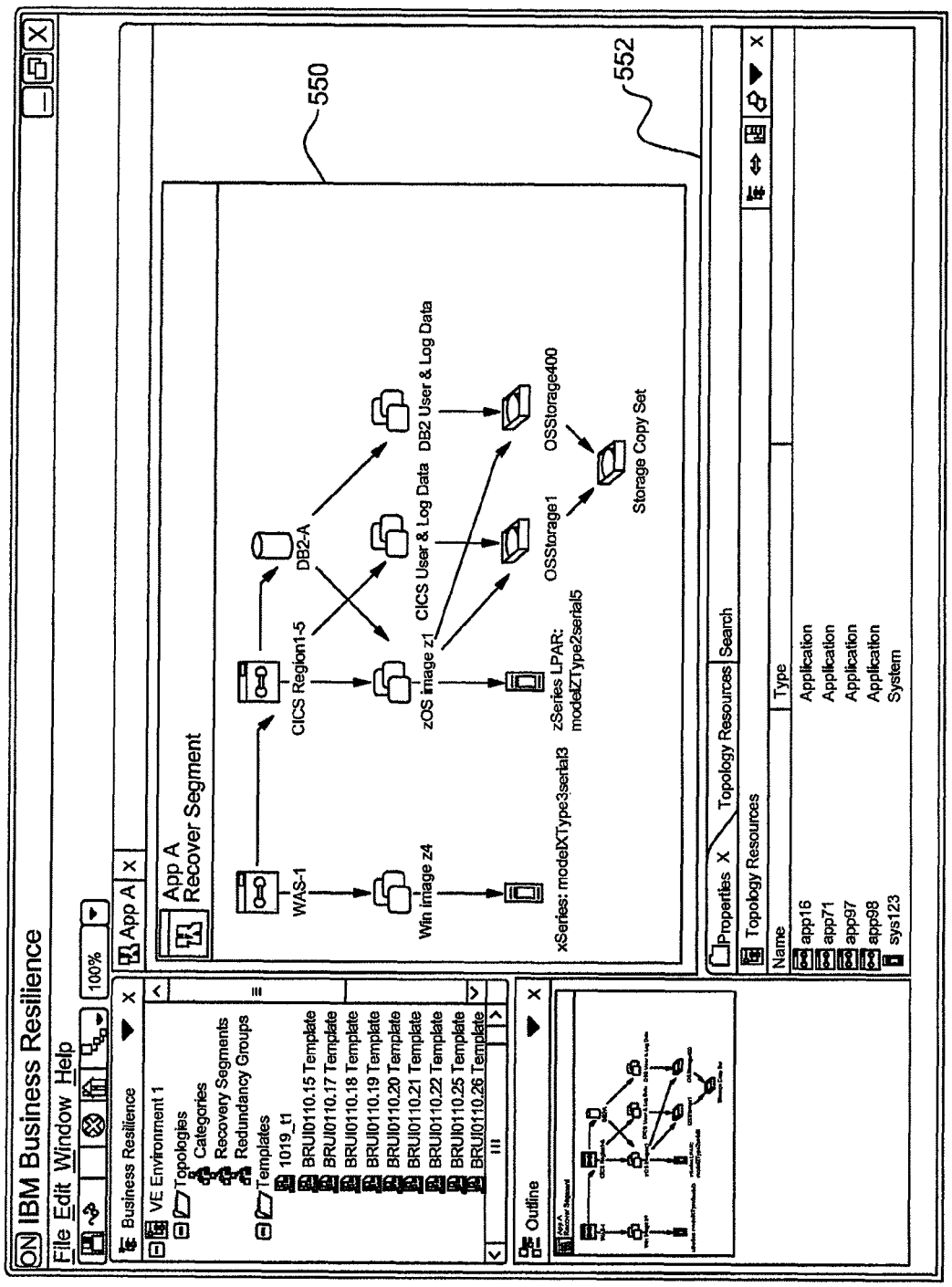
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
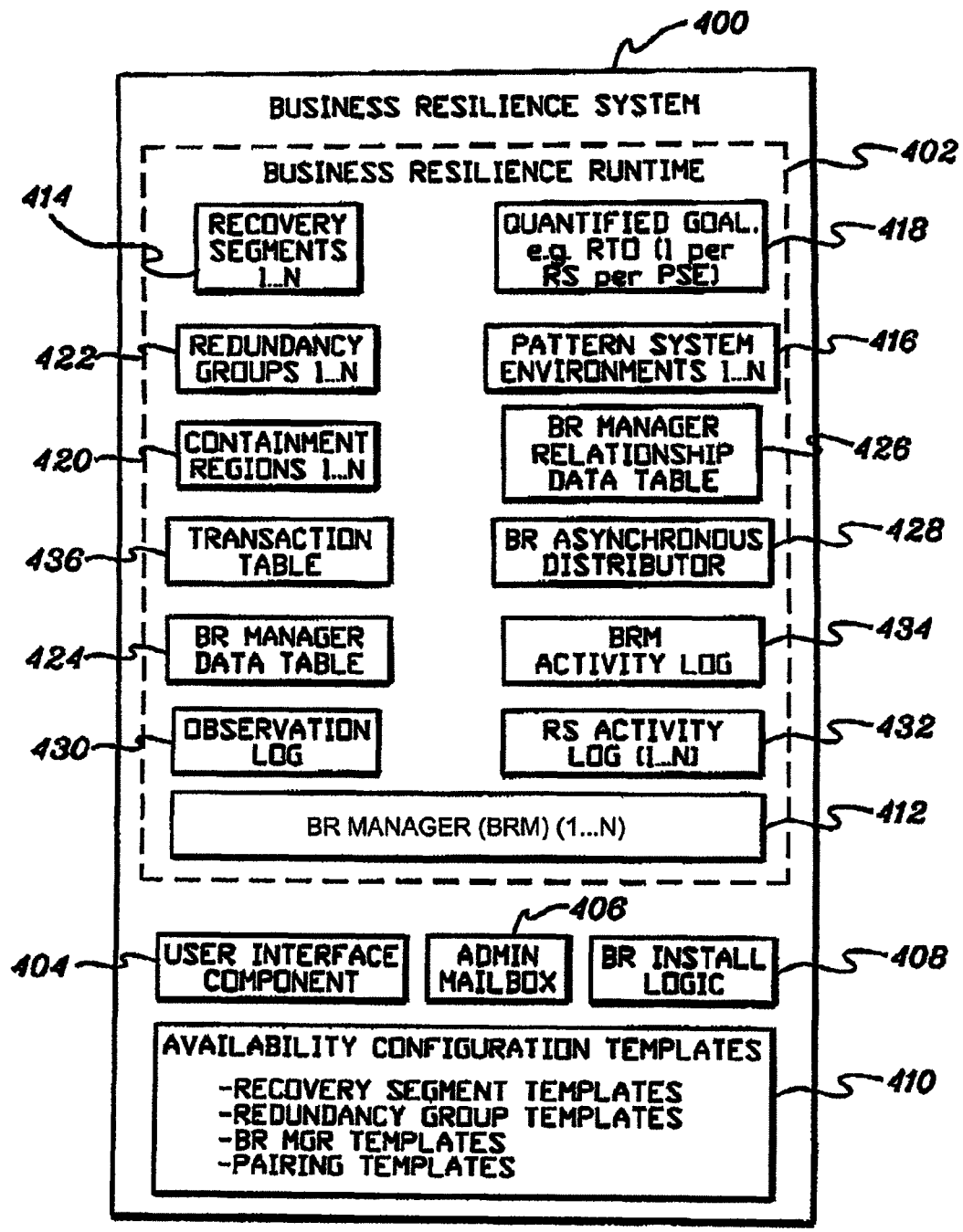
FIG. 4 depicts one embodiment of a Business Resilience System used in accordance with an aspect of the present invention.

BR Admin Mailbox (406) (FIG. 4).

The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates

The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates

The BR System has a set of Redundancy Group templates which represent common patterns of forming groups of redundant resources. These are optionally selected and pattern matched with each individual customer environment to produce recommendations for RG definitions to a customer.

BR Manager Deployment Templates

The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates

The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
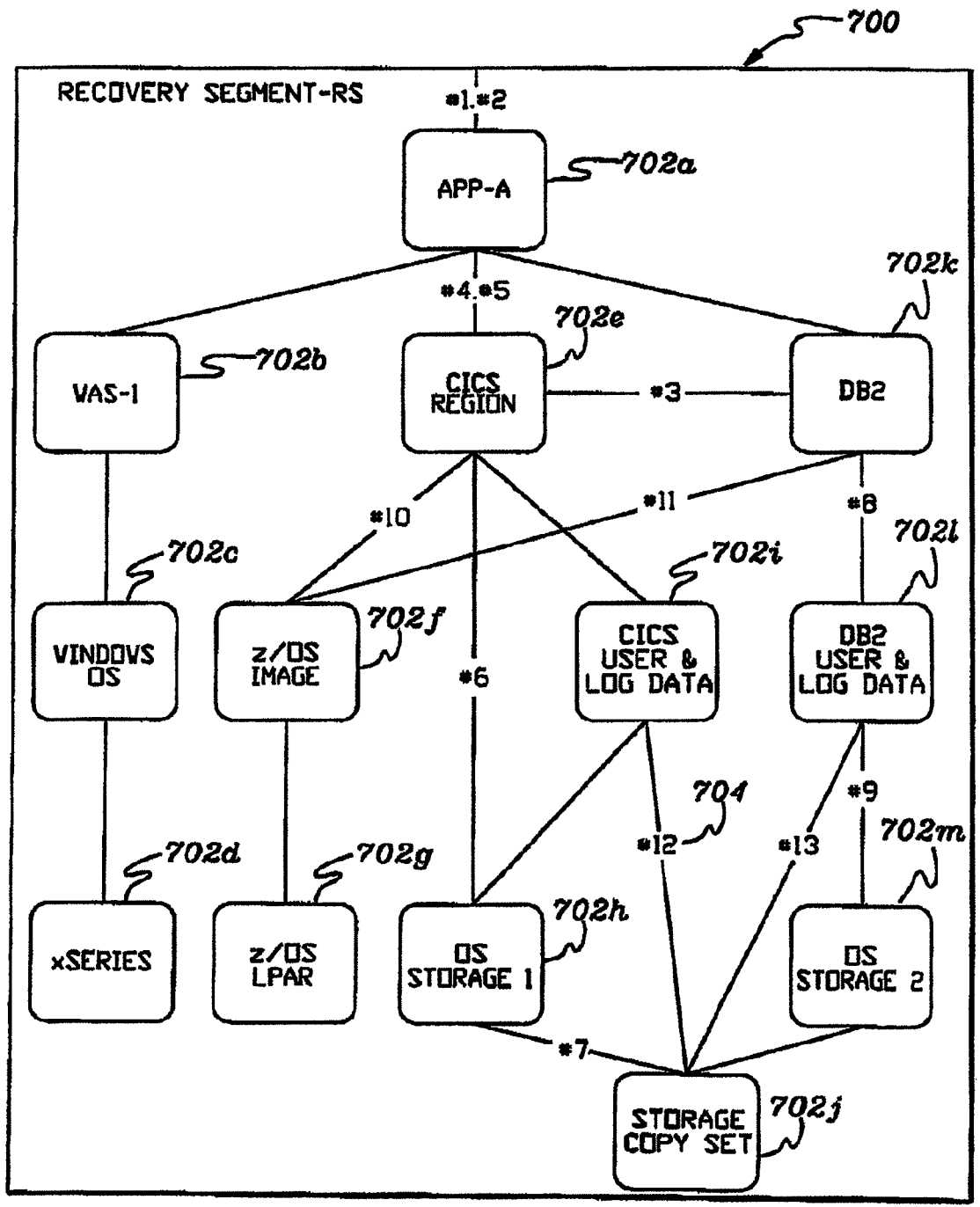
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:

The Recovery Segment RS has been defined associated with an instantiated and deployed BR Manager for monitoring and management.

Relationships have been established between the Recovery Segment RS and the constituent resources 702a-702m.

A goal policy has been defined and validated for the Recovery Segment through interactions with the BR UI.

The following impact pairings have been assigned to the resources and relationships:

| Rule | Resource #1 | State | Resource #2 | State |
|---|---|---|---|---|
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |

-continued

| Rule | Resource #1 | State | Resource #2 | State |
|---|---|---|---|---|
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:

The BRM has subscribed to runtime state change events for the RS.

RS has subscribed to state change events for the constituent resources.

These steps highlight one example of an error detection process:

The OSStorage-1 resource 702*h* fails (goes Unavailable).
RS gets notified of state change event.
1$^{st}$ level state aggregation determines:
Storage Copy Set→Degraded
CICS User & Log Data→Degraded
DB2 User & Log Data→Degraded
DB2→Degraded
CICS→Unavailable
App-A→Unavailable
1$^{st}$ level state aggregation determines:
RS→Unavailable
BRM gets notified of RS state change. Creates the following Containment Region:

| Resource | Reason |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a prespecified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
RS definition from representation of IT Resources;
Goal (RTO) and action policy specification, validation and activation; and
Tooling by Eclipse, as an example, to integrate with IT process management.

Rapid, flexible, administrative level:
Alteration of operation escalation rules;
Customization of workflows for preparatory and recovery to customer goals;
Customization of IT resource selection from RG based on quality of service (QoS);
Alteration of definition of IT resource and business application state (available, degraded, or unavailable);
Customization of aggregated state;
Modification of topology for RS and RG definition;
Selection of BR deployment configuration;
Alteration of IT resource recovery metrics;
Customization of generated Pattern System Environments; and
Specification of statistical tolerances required for system environment formation or recovery metric usage.

Extensible framework for customer and vendor resources:
IT resource definitions not specific to BR System; and
Industry standard specification of workflows, using, for instance, BPEL standards.

Adaptive to configuration changes and optimization:
IT resource lifecycle and relationships dynamically maintained;
System event infrastructure utilized for linkage of IT resource and BR management;
IT resource recovery metrics identified and collected;
IT resource recovery metrics used in forming Pattern System Environments;
Learned recovery process effectiveness applied to successive recovery events;
System provided measurement of eventing infrastructure timing;
Dynamic formation of time intervals for aggregation of related availability events to a root cause; and
Distribution of achieved recovery time over constituent resources.

Incremental adoption and coexistence with other availability offerings:
Potential conflict of multiple managers for a resource based on IT representation;
Workflows for recovery and preparatory reflect operations with meta data linked to existing operations;
Advisory mode execution for preparatory and recovery workflows; and
Incremental inclusion of resources of multiple types.

Support for resource sharing:
Overlapping and contained RS;
Merger of CR across RS and escalation of failure scope; and
Preparatory and recovery workflows built to stringency requirements over multiple RS.

Extensible formalization of best practices based on industry standards:
Templates and patterns for RS and RG definition;
Preparatory and recovery workflows (e.g., BPEL) for customization, adoption; and
Industry standard workflow specifications enabling integration across customer and multiple vendors.

Integration of business resilience with normal runtime operations and IT process automation:
Option to base on IT system wide, open industry standard representation of resources;
BR infrastructure used for localized recovery within a system, cluster and across sites; and
Utilization of common system infrastructure for events, resource discovery, workflow processing, visualization.

Management of the IT environment is adaptively performed, as described herein and in a U.S. Patent Application "Adaptive Business Resiliency Computer System for Information Technology Environments," (POU920070364US1), Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. Patent Applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," (POU920070108US1), Bobak et al., which is hereby incorporated herein by reference in its entirety.

Definition of a RS may use a representation of resources in a topology graph as described in "Use of Graphs in Managing Computing Environments," (POU920070112US1), Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (POU920070113US1), Bobak et al., which is hereby incorporated herein by reference in its entirety.

Specification of the availability state for individual resources, redundancy groups and Recovery Segments may be performed as described in "Use of Multi-Level State Assessment in Computer Business Environments," (POU920070114US1), Bobak et al., which is hereby incorporated herein by reference in its entirety.

Representations for the IT environment in which BR is to operate may be created from historical information captured during observation mode, as described in "Computer Pattern System Environment Supporting Business Resiliency," (POU920070107US1), Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," (POU920070110US1), Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," (POU920070111US1), Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," (POU920070105US1), Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," (POU920070123US1), Bobak et al., which is hereby incorporated herein by reference in its entirety.

A next activity in achieving a BR environment might be execution of the ordered set of operations used to prepare the IT environment, as described herein, in accordance with one or more aspects of the present invention.

Management by BR to achieve availability goals may be initiated, which may initiate or continue monitoring of resources to detect changes in their operational state, as described in "Real-Time Information Technology Environments," (POU920070120US1), Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (POU920070119US1), Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (POU920070118US1), Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (POU920070121US1), Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," (POU920070124US1), Bobak et al., which is hereby incorporated herein by reference in its entirety.

Formulation of a recovery plan is to uphold customer specification regarding the impact recovery operations can have between different business applications, as described in "Managing Execution Within a Computing Environment," (POU920070115US1), Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (POU920070116US1), Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," (POU920070106US1), Bobak et al., which is hereby incorporated herein by reference in its entirety.

Use of provided templates representing best practices in defining the BR system, as described in "Defining and Using Templates in Configuring Information Technology Environments," (POU920070109US1), Bobak et al., which is hereby incorporated herein by reference in its entirety.

Use of provided templates in formulation of workflows, as described in "Using Templates in a Computing Environment," (POU920070126US1), Bobak et al., which is hereby incorporated herein by reference in its entirety.

Making changes to the availability goals while supporting ongoing BR operation, as described in "Non-Disruptively Changing a Computing Environment," (POU920070122US1), Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," (POU920070125US1), Bobak et al., which is hereby incorporated herein by reference in its entirety.

Detecting and recovery for the BR system is performed non-disruptively, as described in "Managing Processing of a Computing Environment During Failures of the Environment," (POU920070365US1), Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
| --- | --- | --- |
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach | Units of elapsed time |

-continued

| Resource Type | Property | Value Range |
|---|---|---|
| | available during IPL | |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections | Integer |

-continued

| Resource Type | Property | Value Range |
|---|---|---|
| | processed at time of network recovery, for the app connection application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |

| Resource Type | Property | Value Range |
| --- | --- | --- |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
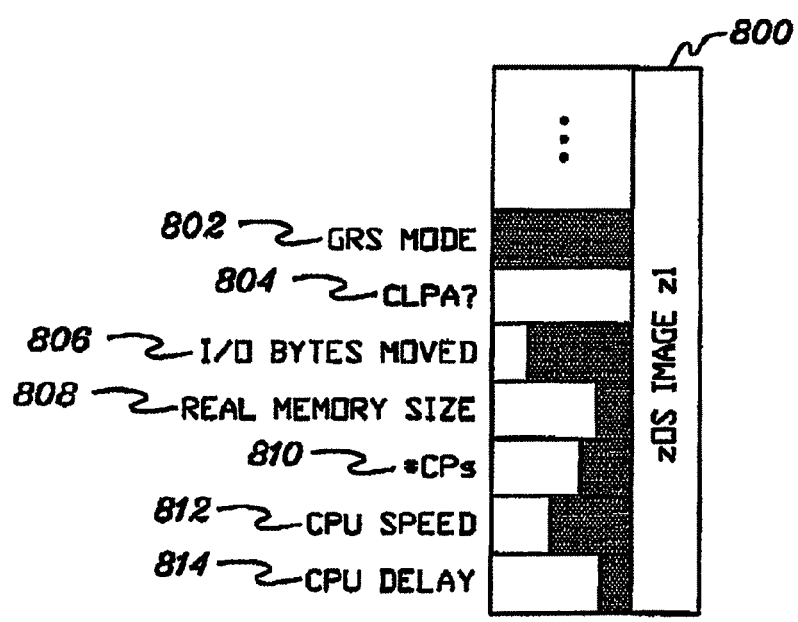
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
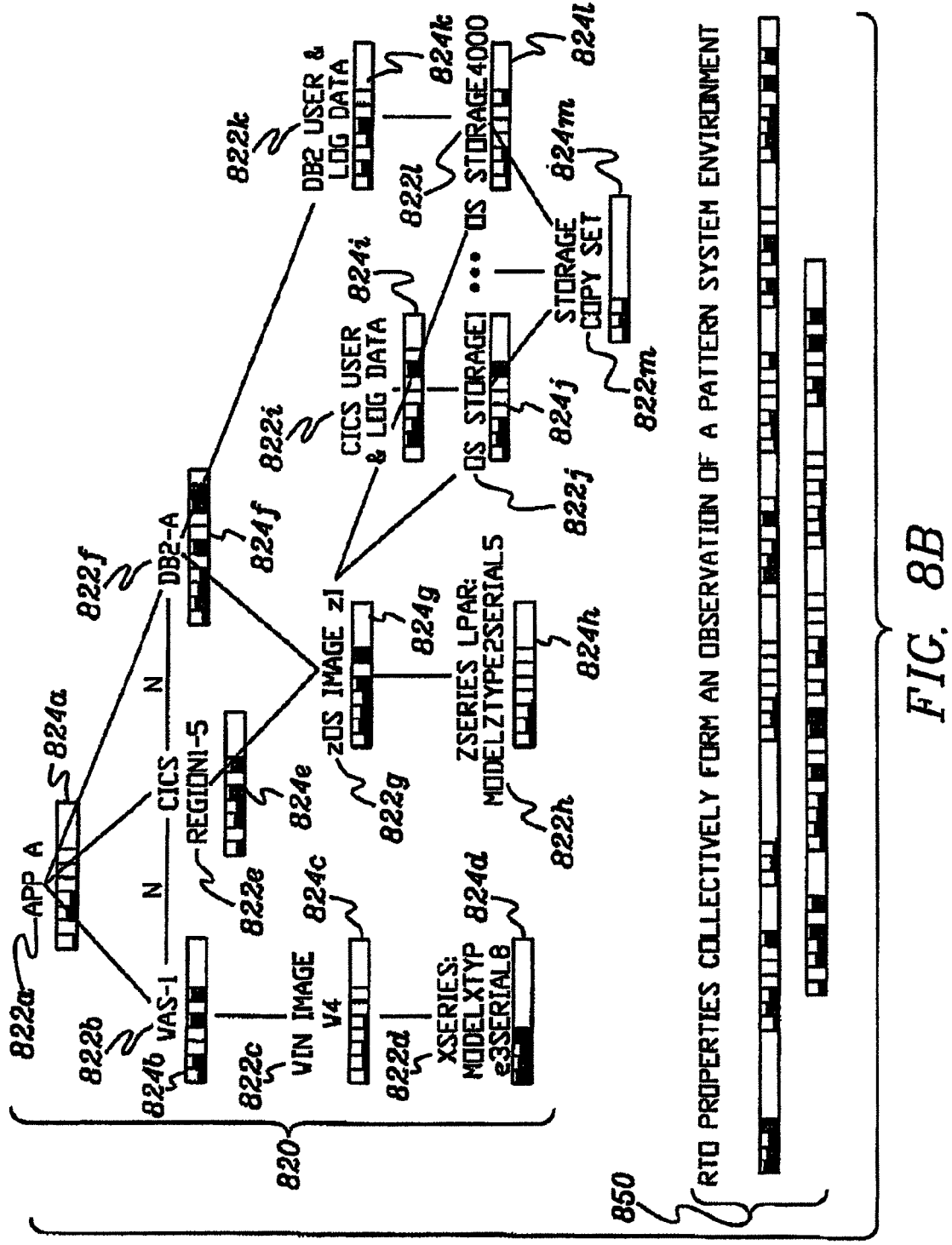
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822*a-m*, each having its own set of metrics 824*a-m*, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings.

The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

| Metric | Qualification |
|---|---|
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

There is also a set of information about the resource that is employed—this information is provided as defaults in the BRMD entry for the resource, but provided to the BR team in the form of best practices information/defaults by the domain owners:

The operational state of the resource at which the observed recovery time interval started.

The operational state of the resource at which the observed recovery time interval ended.

The operational states of the resource at which point it can unblock dependent resources (example: operational states at which a DB2 could unblock new work from CICS, at which it could allow processing of logs for transactions ongoing at time of failure . . . ).

Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.
Are present to understand impacts on managed resources.
No decomposed RTO is associated with an assessed resource.
They are resources on which resources managed by BR depend upon, but are not directly acted on for availability by BR.
They are resources removed (or not explicitly added) from the actively monitored set of resources by the BR admin during RS definition.
They are resources that BR does not try to recover and BR thus will not invoke any preparatory or recovery operations on them.

Similarly, there are likely scenarios where a resource exists in a customer environment that already has an alternative availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

They have an entry in the BRMD, depending on their use, and the BRMD entry has an indication of assessed vs. managed.
The RS subscribes to state change notifications for assessed resources (and possibly other notifiable properties).
Relationships between observed and managed resources are possible (and likely).
BR monitors for lifecycle events on assessed resources in the same manner as for managed resources.
Assessed resources can be added and/or removed from Recovery Segments.
They can be used to contribute to the aggregated state of an RS.

Finally, there are a few restrictions that BR imposes upon assessed resources, in this embodiment:

Again, BR does not invoke any workflow operations on assessed resources.
A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).
To classify operations on resources into these PSEs for purposes of determining operation execution duration.
Help determine approximate path length of operations that are pushed down from BR to the resources, and possibly to the underlying instrumentation of each resource.
Help determine approximate path length of activities executed within BPEL workflows.
Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.
2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, a capability is provided to condition or prepare an IT environment for management of that environment, and in particular, for management towards a specific goal, such as an availability goal (e.g., RTO), a performance goal, etc. For instance, a capability is provided to select, based on the current state of the environment, one or more recommended preparatory actions for the IT environment. The preparatory actions are selected based on actual real-time state of resources of the environment. The selected preparatory actions are then initiated, and the prepared state of the resources associated with the initiated actions is monitored. In one implementation, the selecting, initiating and/or monitoring are performed pro grammatically.

Deficiencies in Existing Capabilities for Preparing the Environment

Customers require the ability to configure an IT environment for their business applications in a manner consistent with the full set of IT resources used to support those applications. The configuration of the IT environment should be flexible and directly associated with service level agreements for the business applications (e.g., how available are the business applications). The manner in which current enterprise IT configurations are managed has high cost, high risk, is inflexible to change, has high labor cost, high skill cost and in no way associates the full set of IT resources used in supporting the business application to a runtime management goal matching the service level agreement. Some of the difficulties include:

1. Many specific configuration parameters associated with individual products are utilized.
2. Coordination of product specific configuration actions to precondition the environment for IT management is a customer issue addressed by staff or authoring of automation scripts which are complex, fragile to change and error prone.
3. Customers must translate precondition actions for products and resources in order to determine effects between individual products and effects of individual product specific configuration actions on the overall business application.
4. There is no system supported means for associating actions taken to condition the IT environment for a specific management goal with actions taken during active IT management of that system for achieving the service level agreement.
5. Operations invoked to precondition the environment must be monitored by the customer staff or scripts with little or no coordination and no correlation with the ability of the preconditioned environment or changes thereto to support the run time goal.
6. Any failure in operations to precondition the environment must be corrected and changes reversed through intervention of customer personnel.
7. On successful preconditioning of the environment, the customer must monitor changes that would impact the preconditioned environment with no context as to the effect of changes to the ability to meet overall business application management goals.
8. Coordination of multiple operations on multiple resources must be coordinated by the customer with successful completion of all required operations triggering customer intervention to begin active runtime management.

Summary of Processing

In accordance with an aspect of the present invention, management of an IT environment includes dynamically and programmatically generating a workflow or process for use in preparing the environment to directly support a specific goal policy requested for a given business application of the environment. The current state of resources, the target system environment, the impact of preparatory actions (a.k.a., operations) on resources, as well as on other IT management operations (such as those for recovery), are considered, in one example, in selecting a set of preparatory actions to be included in the workflow. These actions are evaluated for any dependent operations and ordered appropriately.

In one implementation, the operations for preparing the environment are split into a set of operations that are long running and a set of operations that are idempotent and can run closer to activating the policy for which the preparatory workflow (or process) is generated. At time of activating the policy, the list of prepare type operations that are short running and idempotent are executed in advance of activating the policy.

The preparatory actions are formulated, in one example, into a programmatically executable, transactionally consistent workflow using, for instance, standard workflow technology, such as BPEL. In alternate implementations, the preparatory actions can be placed into a file or script.

Since preparatory actions may fail, there is a set of operations identified in support of the actions in the preparatory workflow to undo the failed operation. These operations are identified; however, the undo workflow is not built until such time as it is needed.

Once the preparatory actions are formulated, the customer can then choose various options as next steps. The customer may choose to view the workflow, submit it, alter it, and/or manually execute any subset of the operations/activities associated with the workflow.

Once a preparatory workflow is submitted for execution, the runtime completion status of the operations, as well as the state of resources, is monitored, in one example, to detect normal or abnormal completion.

Resources may be utilized by two or more business applications resulting in a sharing of a resource. When a resource is shared between two or more business applications, there may be differences in the runtime goal for those applications. Preparation of a resource to achieve the runtime goal of the two or more business applications is performed, such that the goal having the smallest, and therefore, the most demanding runtime goal can be satisfied. Processing to meet the most demanding runtime goal may be referred to herein as meeting the most stringent requirement.

Moreover, the prepared state of the environment is monitored to ensure that resources remain in the prepare state, or one that has further stringency requirements, as defined by the specific runtime goal that is being managed.

Generating the Prepare Workflow

In accordance with an aspect of the present invention, preparatory operations are dynamically selected during programmatic generation of a preparatory workflow or process, as described herein. In another implementation, however, the selection is not included in generation of the workflow. One embodiment of the logic to generate a prepare workflow is described with reference to FIG. 9. As one example, the RS component of the BR system performs this logic.

Figure 9:
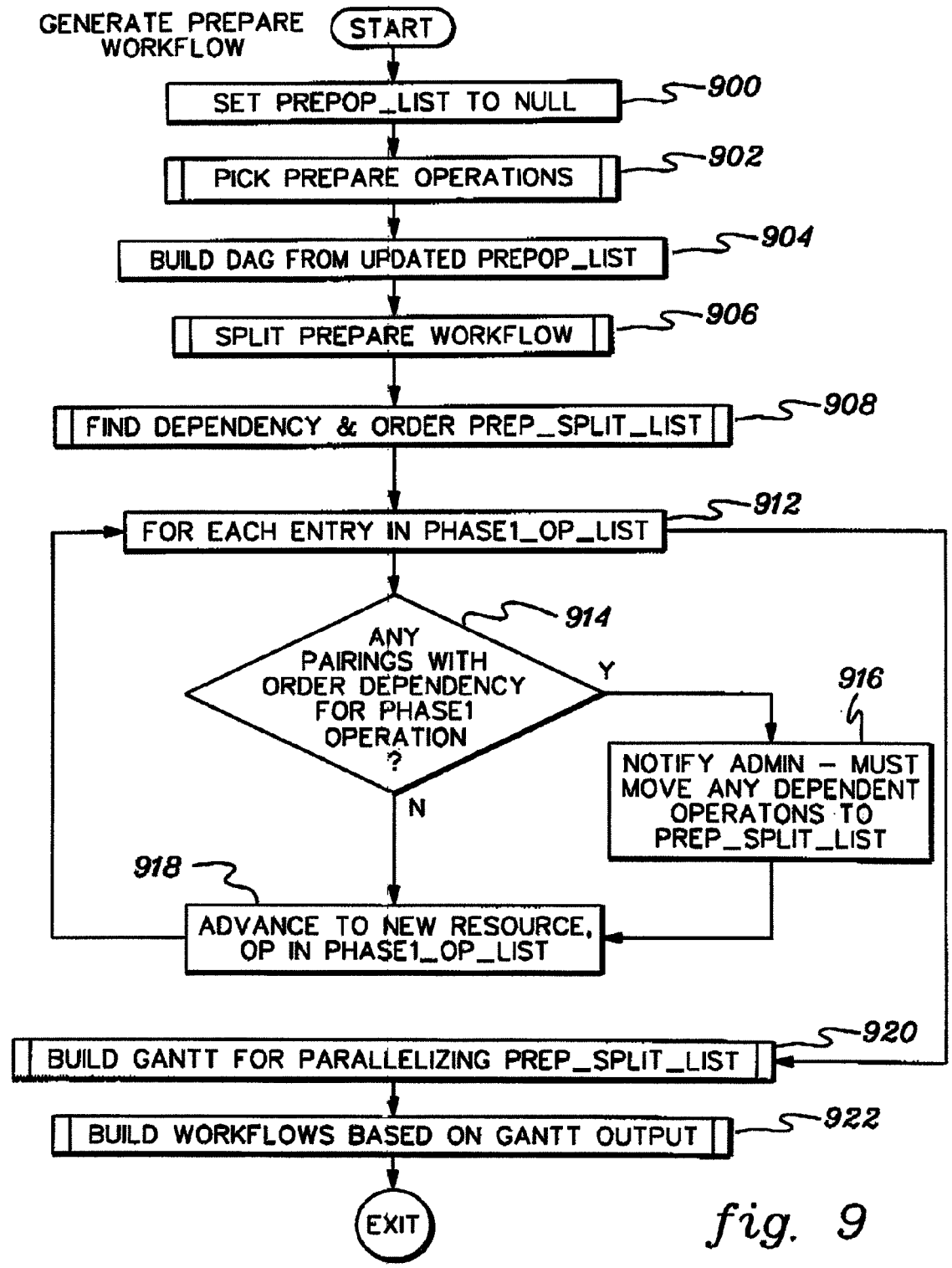
FIG. 9 depicts one embodiment of the logic to generate a prepare workflow, in accordance with an aspect of the present invention.

Referring to FIG. 9, initially, a list to include the recommended preparatory operations is initialized to null, STEP 900, and the logic to select the set of operations to prepare the environment to support the goal is invoked, STEP 902. On return from that set of logic, prepare operations are selected and placed into the prepop_list.

Next, from the updated prepop_list, a DAG is built, STEP 904, using resources as vertices and relationships as edges. Further, in this implementation, the prepare workflow is split into two segments, STEP 906, including, for instance, a set of operations that is performed at prepare environment time, prep_split_list transitioning into the prep_op_list, and a set of operations that is performed substantially immediately prior to initiating active runtime management to the goal, a.k.a, activating the policy for which the workflow is generated. The reason for the split is to handle situations where there may be a large delay between preparing the environment and activating the policy, and where the prepare operations consume extra system resources. If the prepare operation can be delayed, it is put into an activate time sequence of operations, in one example, called phase1_op_list. In particular, after returning from the logic that split the prepare workflow an in_memory p1_activate_list is referenced as the phase1_op_list.

Next, the prep_split_list is analyzed and updated with any operations that the prepare operations depend upon, and then, ordered to be performed in the correct sequence, STEP 908. In one implementation, this can be achieved via the logic described in "Programmatic Validation in an Information Technology Environment" Bobak et al., (POU920070111US), which is hereby incorporated herein by reference in its entirety. Alternatively, dependencies in order of operations and identification of operations which are to precede a given operation may be specified in a file.

Then, for each entry in the phase1_op_list, STEP 912, there is an assessment of whether there are any operations that are dependent, INQUIRY 914. Since this is executed at activate time, no ordering dependencies may exist. In one implementation, the determination as to whether this dependency exists can be accomplished via pairing constructs, as described in "Conditional Computer Runtime Control of an Information Technology Environment Based on Pairing Constructs," Bobak et al., (POU920070110US1), which is hereby incorporated herein by reference in its entirety. Alternatively, ordering of operations and dependencies for before and after operation sequences may be specified in a file or relational database table.

If there are such dependencies, then the admin moves the dependent operations to the prep_split_list, STEP 916. Thereafter, or if the evaluation of INQUIRY 914 is negative, processing continues, STEP 918, until all the entries are processed.

Subsequent to processing the entries in the phase1_op_list, the set of ordered prepare operations (prep_split_list) are parallelized as much as possible, in this implementation, to minimize prepare time, STEP 920. In one example, this is achieved through building a programmatic representation of a Gantt chart, as described in "Programmatic Validation in an Information Technology Environment," Bobak et al., (POU920070111US), which is hereby incorporated herein by reference in its entirety. Alternatively, a file or database table with list of operations and related sequences for before, after and parallelism may be examined to establish an operations sequence.

The output at this stage is an output table including the ordered set of operations, which are sequenced to maintain ordering dependencies, and which are parallelized as much as possible. Using this information, an executable construct to perform the operations is dynamically constructed, STEP 922. In one example, this is accomplished via dynamically and programmatically constructing a BPEL compliant workflow, as described in "Dynamic Generation of Processes in Computing Enviornments," Bobak et al., (POU920070123US1), which is hereby incorporated herein by reference in its entirety.

For example, the set of actions required to precondition an environment for management or to manage an environment can be specified in a number of ways. During dynamic generation of workflows, steps in the workflow are created dynamically during various stages of IT management or preconditioning. These steps can include a coordinated set of operations and staff actions. In one implementation, validating a quantitative availability goal can generate a set of recommended actions to precondition the environment to support the goal, and these actions may be dynamically formulated into a workflow. In other examples, processing that handles change of quantitative goal, change of scope for business applications, and recovery processing to achieve a goal can also dynamically form workflows.

The following are aspects of the dynamic workflow implementation:
1. Dynamic generation of IT management workflows.
2. IT management workflows with transactional semantics.
3. Interleaving programmatic recovery or environment preparatory operations with staff interaction.
4. Workflows activated at appropriate trigger conditions in the system.
5. Conditional execution of activities in a workflow.
6. Activities surrounded by pre- and post-routines to detect completion metrics and success/failure.
7. Handling of time related dependencies across operations on multiple resources.

Processing performed by the Build WF routine includes, for example:
1. For each resource, operation in the input list:
   a. Invoke workflow services (e.g., interfaces to BPEL, or other programmatic interfaces to add activities or actions) to add a preliminary monitoring routine, which establishes a basis for operation execution time.
  i. Input to the preliminary monitoring routine to include the resource operation to be performed.
  ii. Input to the workflow service includes the order, relative to the set of operations, for this operation.
2. When the preliminary monitor routine is invoked just prior to a resource operation:
  a. Determine from current resource data if the operation is to be executed;
  b. If not, exit;
  c. Otherwise, save the starting time for the operation;
  d. Invoke the resource operation;
  e. Save the completion time and execution time duration for the resource operation;
  f. Save the completion status for the resource operation.
3. When the last list operation of the workflow has been reached:
  a. Return resource operation execution time data.

Selection of Preparatory Actions

As described above, during generation of the prepare workflow, prepare operations are selected. This processing is further described herein.

Information about the relationship between resources is used to determine the effect a preparatory action can have on another management operation, such as one for recovery. In one implementation, the information about this effect is found in resource pairings. In another implementation, this information may be extracted from a file that describes effects of preparatory operations on resources, as well as on other IT management operations, such as those used for recovering the system. The information on effect between operations and resources is used to determine which prep (preparatory) operation to choose during formulation of the preparatory workflow (or otherwise). During selection of preparatory operations, the prep effect pairings for a resource are considered, and one or more preparatory actions is chosen. The operation execution time of the recovery operation is what is used in determining whether RTO can be achieved at preparatory time.

Once preparatory operations have been selected, operation dependencies and orderings for the actions listed in the preparatory workflow are evaluated. This evaluation uses information on ordering between operations, such as that found in operation ordering pairings. Further, for each of the identified preparatory operations, a determination is made as to whether the operation is needed, as described below. The required precondition for the resource may have been previously established by the customer via means other than BR, may have been established due to a previously executed preparatory process or may not yet have been established. If the prepared environment has already been established, it may be that the existing environment is prepared to meet the specified recovery time objective (RTO) or a more stringent recovery time objective (RTO) (or other goal). In cases where the prepared environment is conditioned to meet a more stringent RTO goal, BR does not degrade the environment. Notification to the BR administrator may trigger a change in the configuration to lower the stringency at a later time. In one example, pairing information is utilized to determine if a more stringent environment has been prepared.

The following describes an example of a resource pairing construct that can be used to persist information related to preparatory effect:

Preparatory effect pairings (prepeffect):
  Syntax of ordering rules
  For those operations that are part of a prep-effect pairing, the set of rules to represent them is as follows (potentially stored in the BRRD table entry), in one example:
    resource.operation1 prepeffect-directive resource.operation2 set-of-conditions
  resource.operation1
    The resource may be any IT managed resource instance, including those supported for servers, network, applications, etc.
    Operation1 type is preparatory, and is limited to those supported on the specified resource.
    Each resource instance referenced here can be implemented to have an entry in the BR Management Data (BRMD) table, with use of foreign keys for referential integrity.
  resource.operation2
    The resource may be any IT managed resource instance, including those supported for servers, network, applications, etc. The resource can also be the same resource instance as that referenced in resource.operation1.
    Operation2 type is recovery, and is limited to those supported on the specified resource.
    Each resource instance referenced here can be implemented to have an entry in the BR Management Data (BRMD) table, with use of foreign keys for referential integrity.
  The prepeffect-directive
    Is the indication of effect of the prep operation on the IT runtime management operation, such as that for recovery.
    In one implementation, supported directives include: effect
    Examples:
      ReplicationSession.initiate_fc effect LogicalReplicationGroup.Restore_from_fc
  Set-of-conditions
    Is the set of expressions of when this pairing is to be evaluated for validity
    Can have more than one condition.
    Supported conditions:
    RS Admin State of any RS containing the relationship, but is to specify which RS and which admin state.
    RS Operational State (based on state aggregation); same conditions as above with respect to relationships that fall into multiple RS(s).
    Composed or assessed state of either resource involved in the relationship.
    RS.CurrentPSE.
    Property value settings in the BRMD entry of the resource(s) that participate in the pairing.
    Any Redundancy Group (RG) that is related to any of the RS that reference this pairing information.
    Nonblocking states for resources (found in the BRMD entry for the resource).
    Examples: RS.Admin state=PrepareInProgress; Aggregated state of cics_r1=degraded.

Validation of rules with respect to triggers:
> Check for conflicts amongst rules of same category.
> Specific checks:
>> Same property with >1 value specified with =
>> Same property with >1 value specified in greater than/less than inconsistently.
>> If both > and < specified, ensure the ranges intersect.

During selection of preparatory operations, the prepeffect pairings for a resource are considered, and one or more operations is chosen. In one implementation where the management goal is RTO, the operation execution time of the recovery operation is used in determining whether RTO can be achieved at preparatory time.

One embodiment of the logic to select preparatory operations is described with reference to FIGS. 10A-10B. As one example, the RS performs this logic. One goal of this logic is to generate a set of prepare operations to meet the input requirements, and in the implementation described herein, that set is stored in prepop_list.

Figure 10A:
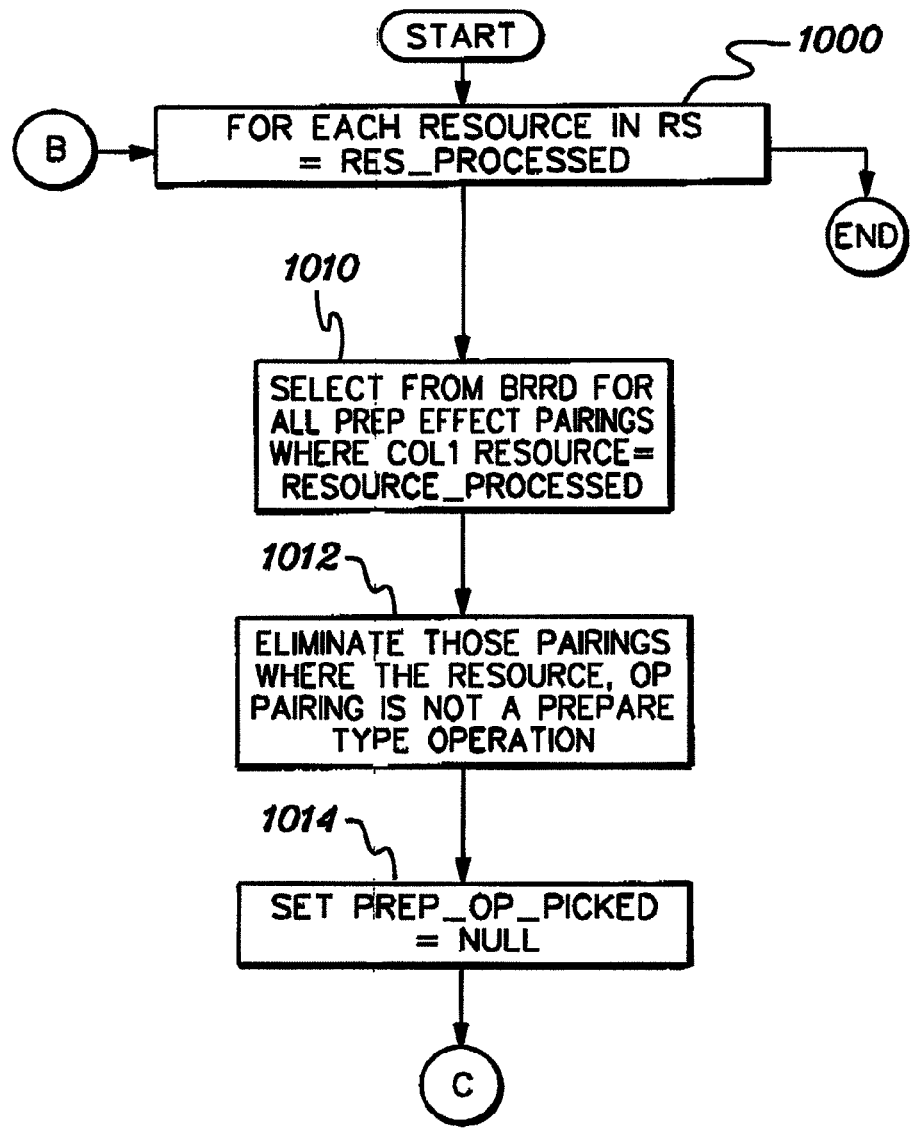
FIGS. 10A-10B depict one embodiment of the logic to select a prepare operation, in accordance with an aspect of the present invention.
Figure 10B:
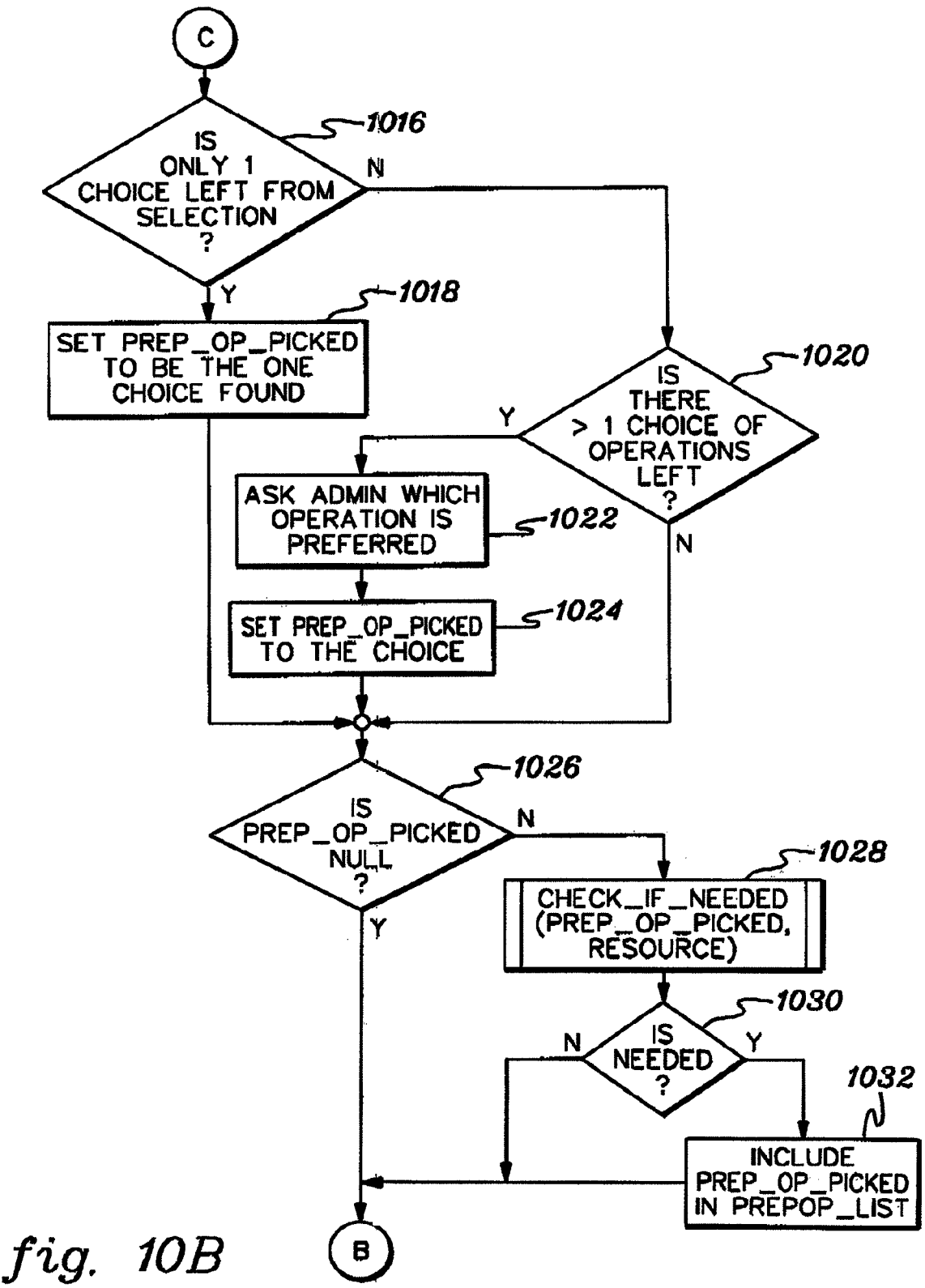

Referring to FIG. 10A, each resource in the RS is processed in succession, STEP 1000. The PrepEffect pairings are selected from the BRRD where the column 1 resource is the same as the resource being processed, STEP 1010. In other implementations, a file that includes information on effect of prepare operations could be searched, rather than a BRRD implementation. From the pairings found, those pairings where the operation is not of a prepare type are eliminated, STEP 1012, and then a prep_op_picked list is initialized to null, STEP 1014.

If there is only 1 choice in the selection from the BRRD, INQUIRY 1016 (FIG. 10B), then prep_op_picked is set to be the one operation left, STEP 1018. If there is more than one choice left, INQUIRY 1020, then the admin is consulted as to which operation is preferred, STEP 1022. In other implementations, other sources of information about the environment or selection preferences could be used to determine which of the potential operations is desirable. For example, the prep op resulting in the smallest recovery time operation could be selected. The preop_op_picked is set to the one selected by the admin, STEP 1024. If there are no choices, INQUIRY 1020, prep_op_picked remains null. Subsequent to STEPs 1018, 1024 or INQUIRY 1020, prep_op_picked is tested to see if it is still null, INQUIRY 1026. If it is null, the flow continues to process the next resource, if any, STEP 1000 (FIG. 10A).

Returning to INQUIRY 1026 (FIG. 10B), if prep_op_picked is not null, the operation in prep_op_picked is checked to see if it is actually needed, based on the state of the resource, STEP 1028. In one implementation, this check is accomplished via the description in the flow for check_if_needed, as detailed in the section below. If the operation is needed, INQUIRY 1030, then it is included in the prep-op_list, STEP 1032. Otherwise, it is not included. In either case, the next resource, if any, is selected and processed, STEP 1000 (FIG. 10A).

Check if Needed

One implementation of the logic to check whether an operation is necessary is described with reference to FIG. 11. As one example, the RS performs this logic.

Figure 11:
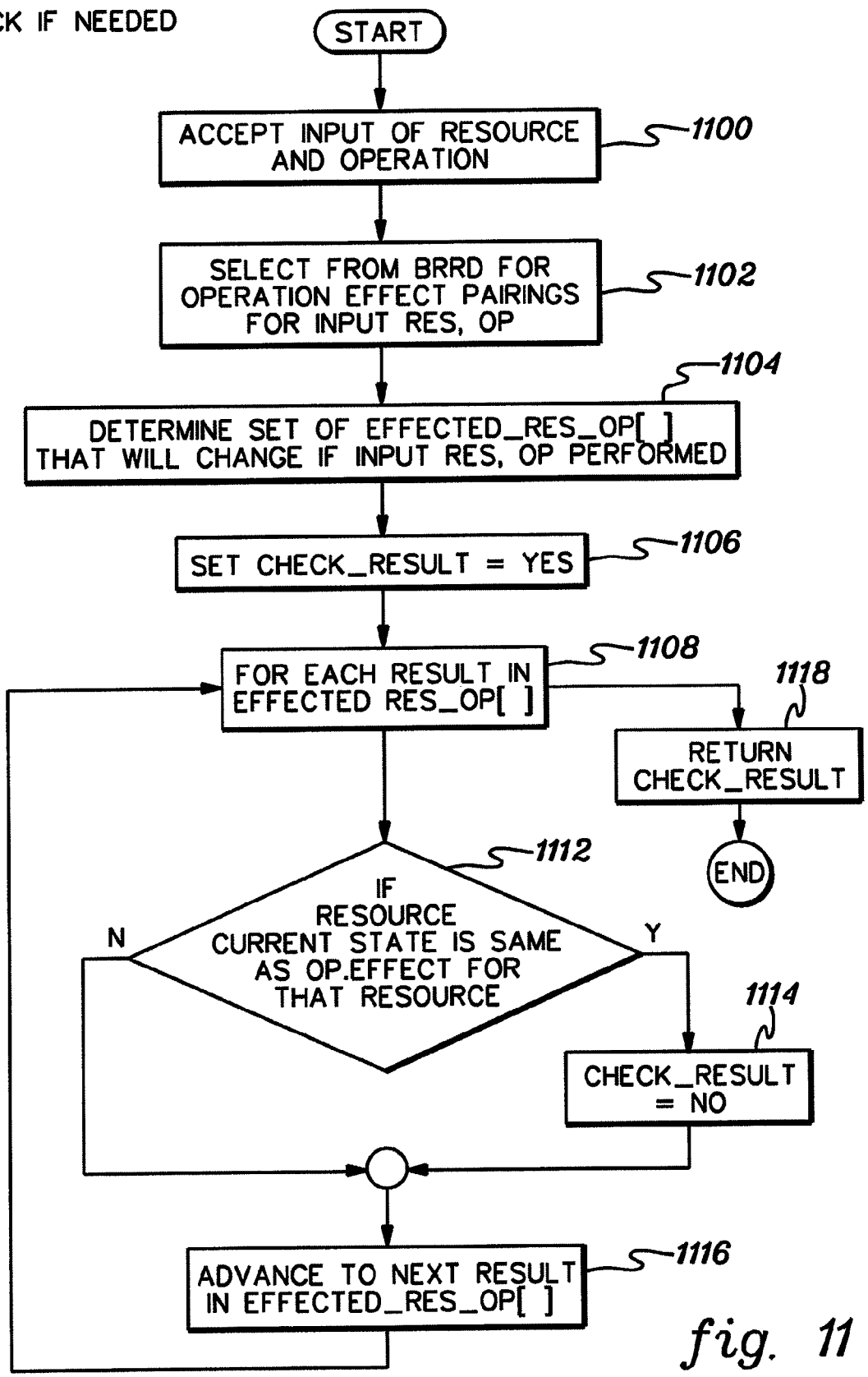
FIG. 11 depicts one embodiment of the logic to perform a check, if needed, in accordance with an aspect of the present invention.

Referring to FIG. 11, the input operation and resource are accepted, STEP 1100, and then the effects of that operation are determined. In one implementation, this is accomplished via inspecting the BRRD entries and choosing operation effect pairings that include the input resource and operation, STEP 1102. Next, the set of effected resources that will change if the input resource operation is performed is determined by using the results of the selection from the BRRD, STEP 1104.

Additionally, a check_result flag is initialized to 'yes', STEP 1106, and for each of the effected resources found, STEP 1108, the resource's current state is compared to the state that will result if the input resource, operation is performed. If the resource state is already in the state that will result if the operation is performed, INQUIRY 1112, then check_result is set to 'no', STEP 1114. Thereafter, or if the resource is not already in that state, processing continues to advance to the next resource in the effected list, STEP 1116, until all resources have been processed. The check_result is returned, STEP 1118, on exit.

The implementation described sets check_result to 'no' if any of the resources in the effected set are in the same state as what would result if the input resource, operation were performed. In other implementations, all resources may be required to be in the same state, or if there is a mixed situation where some resources are in the target state and some are not, the admin could be consulted to determine whether the operation is necessary. In addition, an optimization could be implemented that exited out of the resource processing loop starting at STEP 1108 once check_result is set to 'no'. Further, a cascade of operations could be tested where an operation changes the state of a resource which in turn results in a state change of a second (or third, fourth . . . ) resource.

Splitting Preparatory Actions Across Short and Long Running

In one embodiment, the preparatory time operations are split into those that can be done ahead of time and those that are done when the policy is actually activated. Since an administrator may choose to inspect the workflow, or due to the current system environment being different than what is in the policy, a substantial amount of time may elapse between generating the preparatory workflow and activating the policy for which the prep workflow was generated. To minimize the time where increased resource consumption caused by the prepare actions exist without the activation of the associated policy, an aspect of the present invention splits the operations into operations that execute at prepare time and operations that execute closer to activation of the policy for which the prepare is generated.

The operations performed closer to activation of policy time are idempotent; that is, they are operations for which the recovery option of reissuing the operation will not damage the resource and will result in correct behavior. In addition, these operations do not have ordering dependencies. In one implementation, the split of preparatory vs phase 1 activate operations is based on a specific indication for the operation. In another implementation, that determination may be governed by the operation execution duration and customer specification of operation time to determine the split. The set of resources acted on by the preparatory workflow operations is maintained for later processing phases of policy preparation and activation.

First phase activate operations are invoked by BR sequentially and synchronously. If interruptions in processing occur during 1st phase activate processing, recovery processing reissues the set of 1st phase activate operations. First phase activate operations on resources are idempotent, have limited operation execution duration and are nondisruptive, if executed more than once.

One embodiment of the process to split the prepare workflow into prepare and activate time sequences is described with reference to FIG. 12. As one example, the RS performs this logic.

Figure 12:
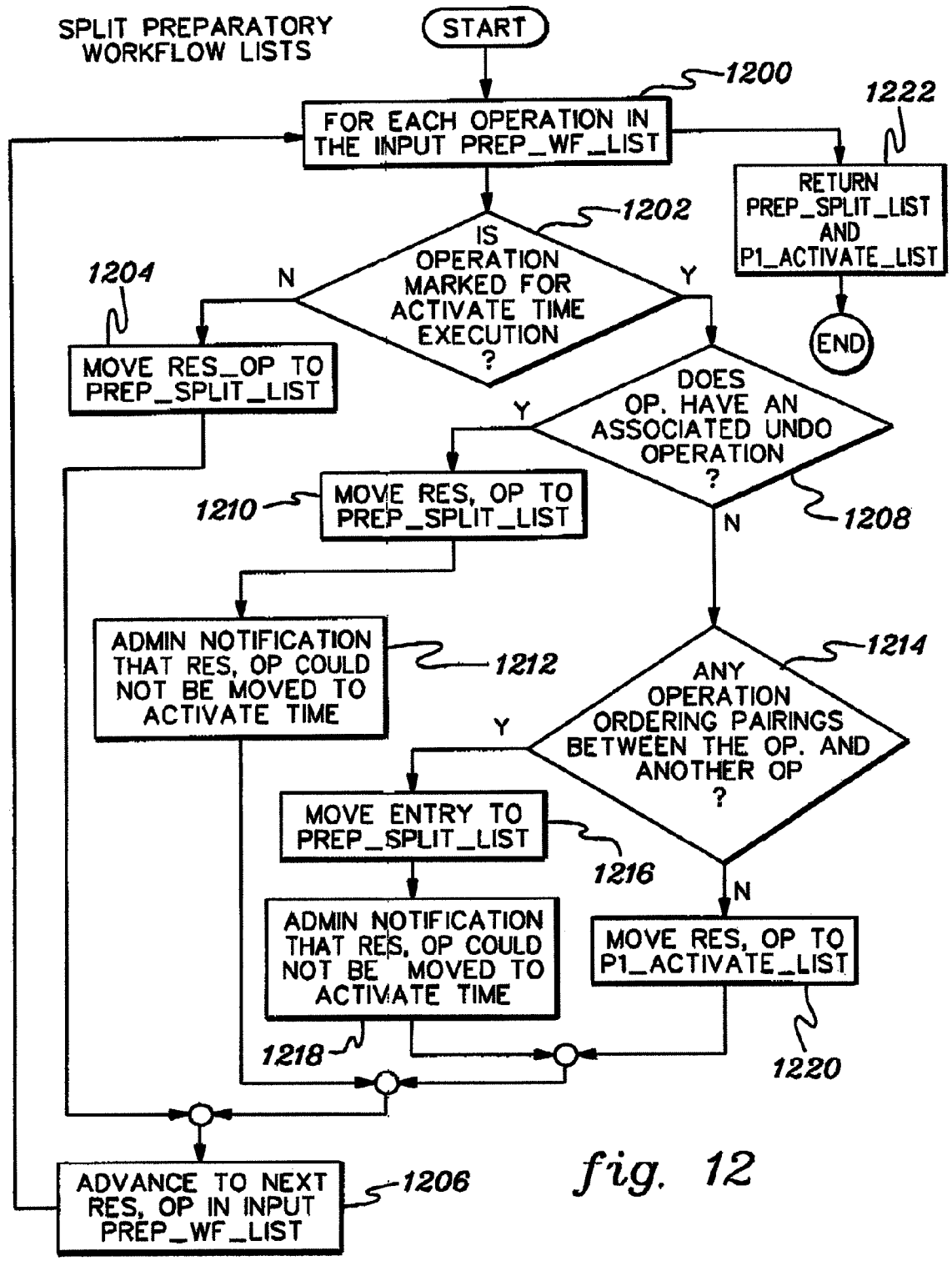
FIG. 12 depicts one embodiment of the logic to split preparatory workflow lists, in accordance with an aspect of the present invention.

Referring to FIG. 12, the prepare list is input and for each operation in the input prep_wf_list (same as prep_op_picked_list from the caller), STEP 1200, an assessment is made as to whether the operation is marked to execute at activate time, INQUIRY 1202. In one implementation, these operations are marked via an explicit indication stored in the data about an operation, as part of the BRMD entry. In another implementation, a separate list of activate time operations could be maintained, or the determination could be made automatically based on the execution time for that operation. If the operation is not marked for activate time execution, it is moved into the set that will be performed at prepare time, prep_split_list, STEP 1204. Processing continues to advance to the next operation in the list, STEP 1206, and back to process that next operation, STEP 1200.

If the operation is marked for activate time, INQUIRY 1202, a determination is made as to whether the operation has an associated undo operation, INQUIRY 1208. In one implementation, the undo operation associated with an operation is indicated in the operation table entry associated with the operation, accessed via the BRMD entry. In another implementation, a set of operations and associated undo operations could be stored in a file. If the operation does have an associated undo, then the resource,operation pair being processed is moved to the prep_split_list, STEP 1210, and the admin is notified that the resource, operation could not be moved to activate time even though it was indicated to be executed at activate time, STEP 1212. Processing then continues at STEP 1206.

If the operation does not have an undo operation, INQUIRY 1208, a determination is made as to whether there are any order dependencies between this operation and another operation, INQUIRY 1214. In one implementation, this determination is made through analyzing the operation order dependency pairings. In another implementation, the dependency information between operations could be stored in a separate file. If there are dependencies, the resource, operation being processed is moved to the prep_split_list, STEP 1216, and the admin is notified that the resource, operation could not be moved to activate time even though it was indicated to be executed at activate time, STEP 1218, due to order dependencies. Processing then continues at STEP 1206.

If there are no order dependencies, INQUIRY 1214, then the resource, operation being processed is moved to the p1_acivate_list, STEP 1220. Processing continues at STEP 1206.

At the conclusion of processing, two lists are returned: the prep_split_list that includes prepare time operations; and the p1_activate_list that includes activate time operations, STEP 1222.

Persistence of Preparatory Actions

In one implementation, the set of preparatory actions is represented as an industry standard, executable workflow using BPEL technology. The preparatory workflows are associated with the following, as examples:

A specific business application, represented in one implementation as a Recovery Segment;

A quantifiable goal IT management policy, such as Recovery Time Objective management goals; and A system environment for which the policy applies; in one implementation, represented programmatically as Pattern System Environments (PSE).

The stored workflow can be viewed by the customer with any tool that accepts industry standard BPEL as input. Customer modification of a generated preparatory workflow is supported by BR. Customers may add, remove or reorder operations in a preparatory workflow or add staff operations to a preparatory workflow. Alterations to operations contained in the workflow are limited by BR. In one example, only supported preparatory operations on resource(s) associated with the RS(s) are allowed to be added. BR creates a list of resource, operation pairs that are valid candidates for presentation to the BR administrator through the BR UI. The phase 1 activate operations are also presented through the UI. Alterations to the preparatory workflow are evaluated by BR with ordering and dependent operations being adjusted as required. Any operations removed from the phase 1 activate set of operations are incorporated into the preparatory workflow. A modified workflow and phase 1 activate list of operations are presented back to the customer for acceptance.

By reconstructing the operation ordering list, running through operation dependency checking and rebuilding the Gantt chart and preparatory workflows, the structure of BR workflow, operations list and list of modified resources are maintained. There is no direct storage of the customer modified preparatory workflow. The BPEL workflow is utilized to inform the customer of the BR proposed preparatory operations, and to allow workflow tools to modify the workflow within BR accepted constraints. The resulting workflow is converted back to a BR internal representation and processed in the same manner as processing for the original list of preparatory operations generated by BR.

Subsequent changes to the RS environment may necessitate changes to the prepared environment and regeneration of a preparatory workflow or incremental change to the previously generated preparatory workflow. If a customer has modified the prep workflow, in this embodiment, BR does not automatically generate a change to the prep work and is to request BR administrator intervention.

Options for Initiating Preparatory Actions

Preparing a policy may submit the preparatory workflow as generated or from customer modification to the preparatory workflow. The customer initiates the prepare environment request. In one implementation, the BR administrator requests Prepare Policy via the BR admin UI. BR validates the current environment is unchanged from the environment that existed when the preparatory workflow was created. Notification is provided to the BR admin if the environment has changed, and therefore, the policy is to be validated again and a new preparatory workflow created. BR presents the preparatory workflow and the phase 1 activate operations for customer acceptance. If accepted, the preparatory workflow is submitted for execution and monitoring of the preparatory workflow is initiated. Monitoring includes observing changes in resource state for which preparatory operations have been initiated and monitoring the progress of the workflow. Only one preparatory workflow is in progress at any point in time, in this example, and BR enforces the restriction.

The following is one example of an overview of the steps taken to submit a preparatory workflow:

Verify that the environment is consistent with that in which the prep workflow was created.

Allow one and only one prep workflow to be executing for a RS at any point in time.

Verify that the customer wishes to have the prep workflow submitted and run with operations in prep and in 1st phase activate.

Initiate a periodic poll observation to monitor resources that have operations in the prep workflow.

Subscribe to resources having operations in the prep workflow.

Submit the preparatory workflow to BPEL run time for execution.

Initiate monitor of preparatory workflow in progress to track execution and insure progress of prep workflow monitored (even though wrappers on workflow activities report completion status).

The steps summarized above are described in further detail with reference to FIGS. 13A-13D, which depict one embodiment of the submit prepare logic. As one example, the RS performs this logic.

Figure 13A:
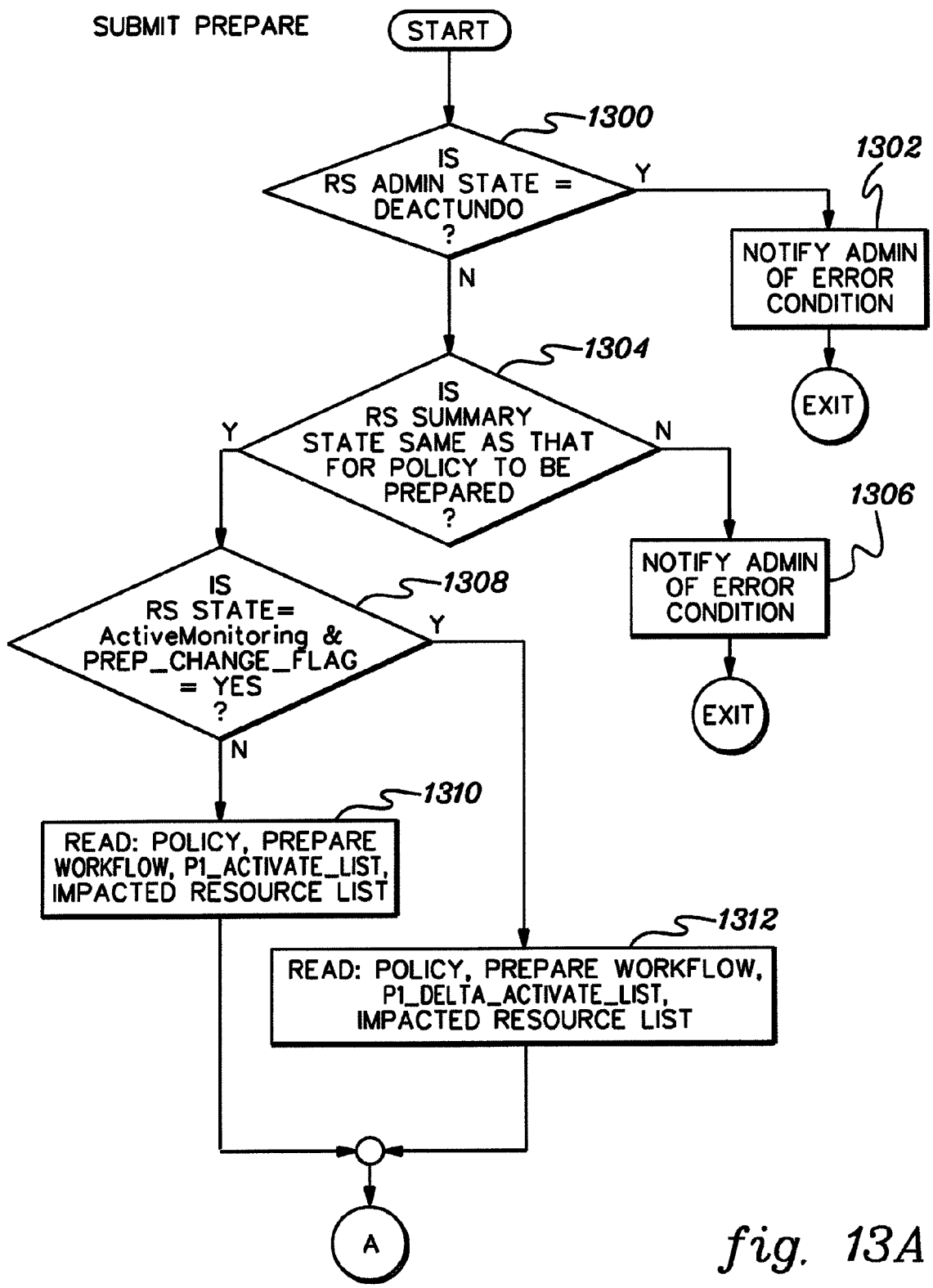
FIGS. 13A-13D depict one embodiment of the logic to submit a prepare workflow, in accordance with an aspect of the present invention.

Referring to FIG. 13A, initially, the RS for which a prepare is being submitted is checked to ensure that it is not in a state where a deactivate was done and all the prep actions were selected to be undone, INQUIRY 1300. If it is the case that the RS is in a DeactUndo state, then the admin is notified of the error condition, STEP 1302, and processing exits. Otherwise, the RS is checked to make sure that no environmentals have changed between the time of generating the prepare and submitting the prepare workflow, INQUIRY 1304. This is accomplished in one implementation by inspecting the summary state stored with the RS and updated when environmental changes occur. If the summary state has changed, then the admin is notified, STEP 1306, and processing exits with error.

If the summary state is the same, INQUIRY 1304, then the RS state is checked to ascertain whether this is a prepare submission to change the environment to support a new goal or a new scope of resources associated with the RS, or a new prepare for an environment that has not previously been prepared for a goal, INQUIRY 1308. If this is a new prepare, then the policy structure, prepare workflow, p1_activate_list, and impacted_resource_list are read, STEP 1310. If this is a prepare to change the environment to support the goal or new RS resource scope, the policy structure, the delta prepare workflow, the p1_delta_activate_list, and impacted_resource_list are read, STEP 1312.

Figure 13B:
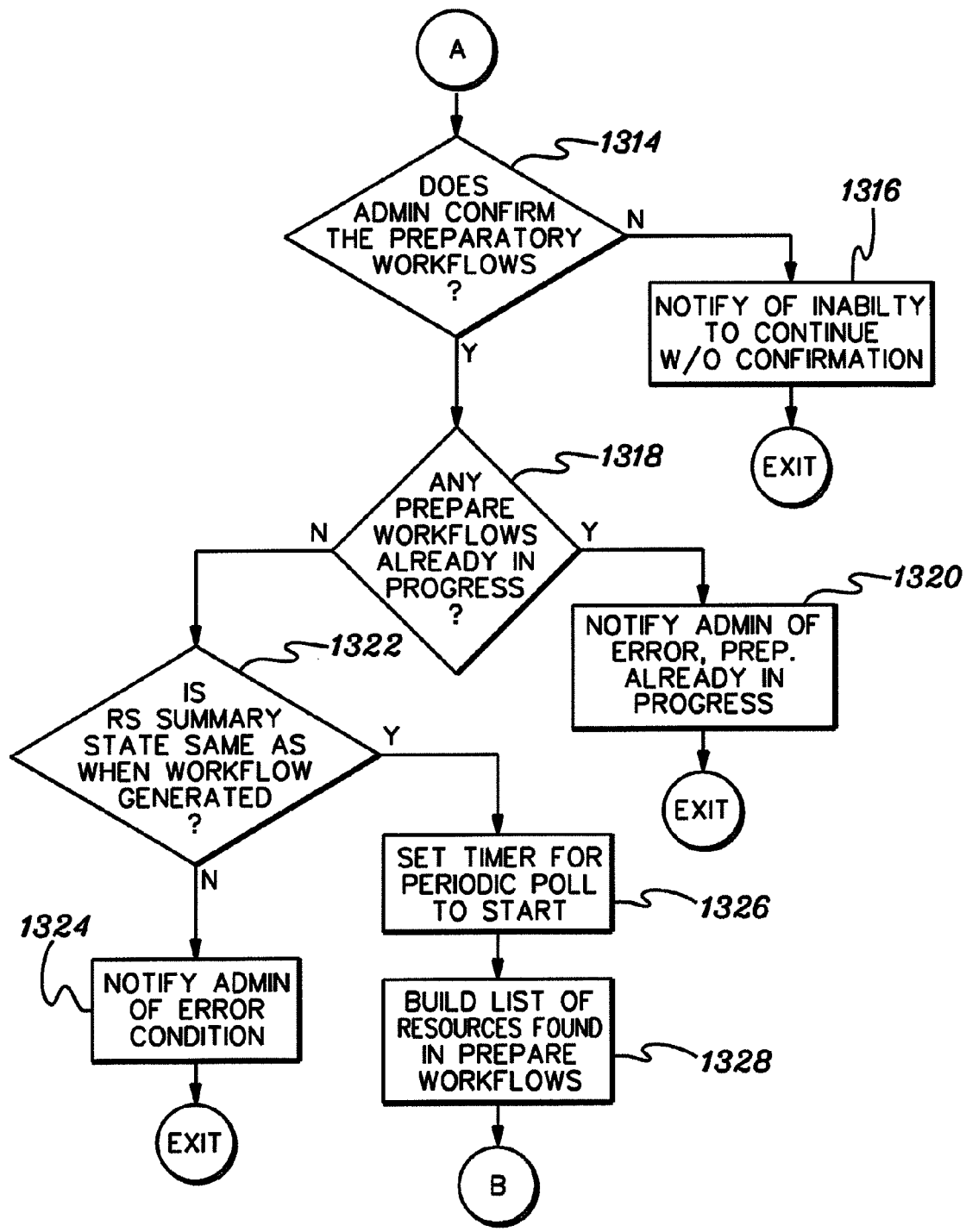

Next, the admin is consulted as to whether the preparatory workflows are confirmed to be accurate, INQUIRY 1314 (FIG. 13B). In other implementations, this step may be skipped. It is included in the implementation chosen as a safeguard measure to verify the workflows prior to running. If the admin does not confirm these workflows, the admin is notified that processing is not to continue, STEP 1316, and processing exits. In another variation of an implementation, the processing could notify the admin of inability to continue, but then bring the customer to UI interaction that would prompt for generating a new prepare for the same policy, or to modify the prepare workflow.

If the admin confirms the workflows, INQUIRY 1314, then a check is made as to whether there are any other prepare workflows already in progress, for any RS in the environment, INQUIRY 1318. If so, the admin is notified that this prepare is to be delayed to give time for an ongoing prepare, STEP 1320, and then processing exits. In other implementations, multiple prepares could be allowed to occur simultaneously. However, for environments that share a large number of resources across business applications, preparing a set of resources for one business application's goal may in fact impact other business applications.

Figure 13C:
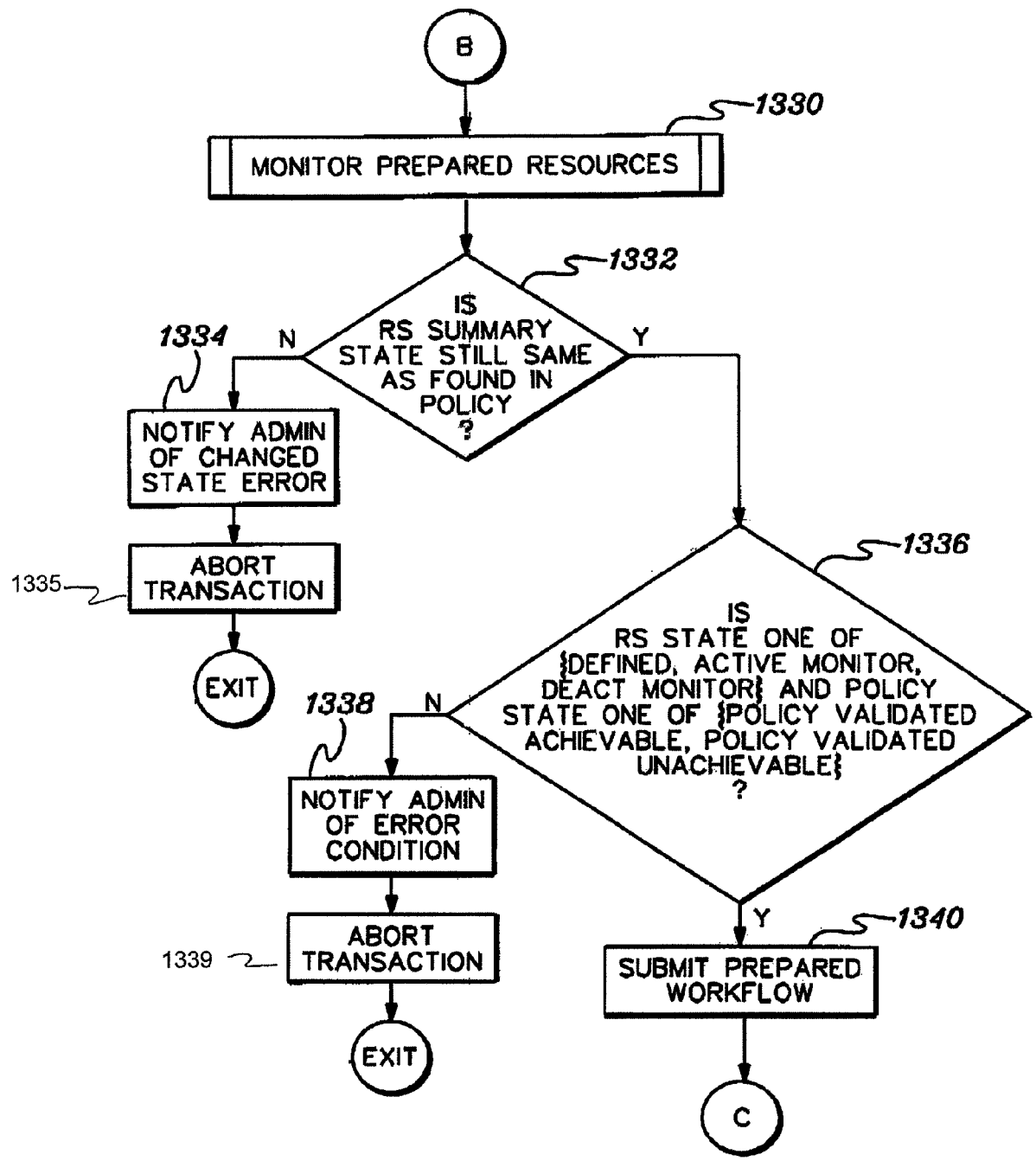

Retuning to INQUIRY 1318, if no other prepares are in progress, then the RS is checked to see if the environment has changed after the prepare workflow was generated, by comparing the current summary state with that which was saved at prepare time, INQUIRY 1322. If the states are not the same, the admin is notified of the error, STEP 1324, and processing exits. If the summary states are the same, the timer for periodic poll is started, STEP 1326, and the list of resources which are found in the prepare workflow is built, STEP 1328. This list is then submitted to a routine which monitors the prepared resources, STEP 1330 (FIG. 13C).

Thereafter, the summary state of the RS is checked again for any changes in the environment, INQUIRY 1332, and if there have been changes, then the admin is notified, STEP 1334, and processing aborts, STEP 1335, and exits. If the summary state is the same, then the RS state is checked to make sure it is one of {Defined, ActiveMonitor, or Deact-Monitor}, and that the policy state is one of {PolicyValidatedAchievable or PolicyValidatedUnachievable}, INQUIRY 1336. If these state conditions are not true for RS and policy, then the admin is notified of the error, STEP 1338, and processing aborts, STEP 1339, and exits.

If the RS and policy states match one of the required states, INQUIRY 1336, processing continues and the prepare workflow is submitted to the workflow engine, STEP 1340. In one implementation, the workflow engine can be a BPEL compliant workflow engine, and the workflows are themselves BPEL compliant. In another example, the workflow may be implemented as a script and submitted to the processor for the selected scripting language. In another example, the workflow can be a set of system commands submitted to a set of resource specific interfaces through which actions can be initiated.

Figure 13D:
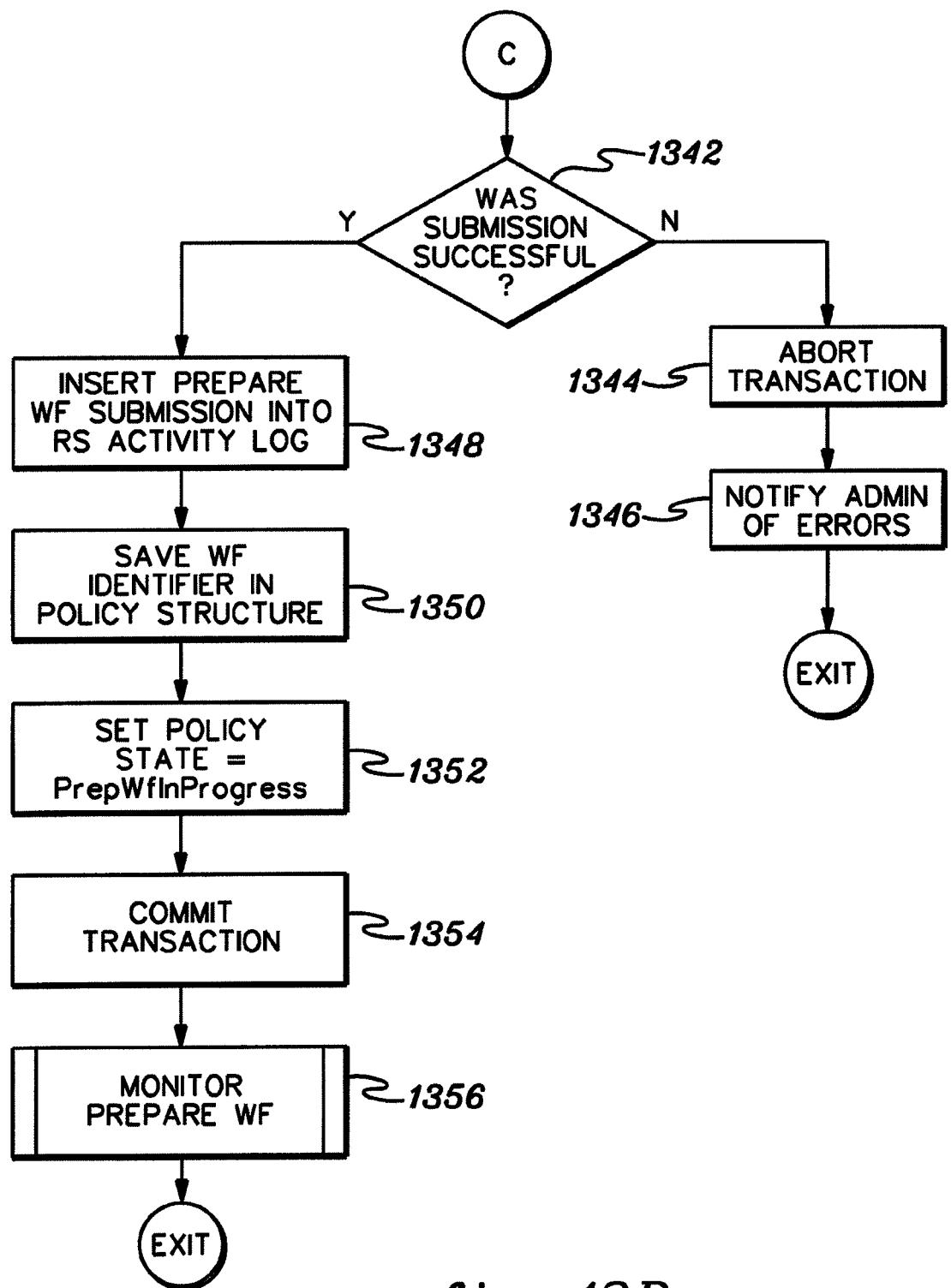

Next, a determination is made as to whether the submission was successful, INQUIRY 1342 (FIG. 13D). The determination is made based on any return codes from the workflow engine or system command processors, or other implementation to accept the actions on the resources. A successful submission may not indicate that the workflow succeeded, rather that it was submitted or sent properly. If the submission is not successful, then the transaction is aborted, STEP 1344, the admin is notified, STEP 1346, and processing exits. If the submission is successful, then the RS Activity log is updated with the submission status, STEP 1348, the workflow identifier is saved in the policy structure, STEP 1350, the policy state is updated to be PrepWFInProgress, STEP 1352, and the transaction is committed, STEP 1354. Finally, there is processing initiated to monitor the prepare workflow in progress, STEP 1356, as described below, and the submit prepare processing exits.

Monitor Preparatory Actions for Normal or Abnormal Completion

The submitted preparatory workflow is monitored for completion. Normal or abnormal completion of the preparatory workflow is provided to the administrator, in one implementation, through the BR admin mailbox (mbox). Observation of resources for status of preparatory operation intent is discontinued if the preparatory workflow failed to execute successfully. On unsuccessful execution of the preparatory workflow, an undo workflow is created to back out any operations performed on resources for preparatory purposes. Monitoring of the undo workflow is initiated. On successful completion of the preparatory workflow, resources are continued to be observed for maintenance of preparatory intent and completion of the preparatory process is recorded enabling new BR admin changes to the environment to be performed.

The following is one example of an overview of the steps taken during the monitoring of the prepare workflow:

Record completion of preparatory workflow execution.
Notify admin of success or failure.
Unsubscribe or unregister for changes of state for resources found in the preparatory workflow, if the preparatory workflow is to be undone.
Build undo preparatory workflow, if required.
Initiate undo preparatory workflow on preparatory workflow failure and store id of undo workflow returned from BPEL runtime,
Initiate monitor of undo preparatory workflow, if required.
End serialization of preparatory flows on successful completion; otherwise, undo workflow in process.

One embodiment of the logic to monitor a prepare workflow is described with reference to FIGS. 14A-14C. As one example, the RS performs this logic.

Figure 14A:
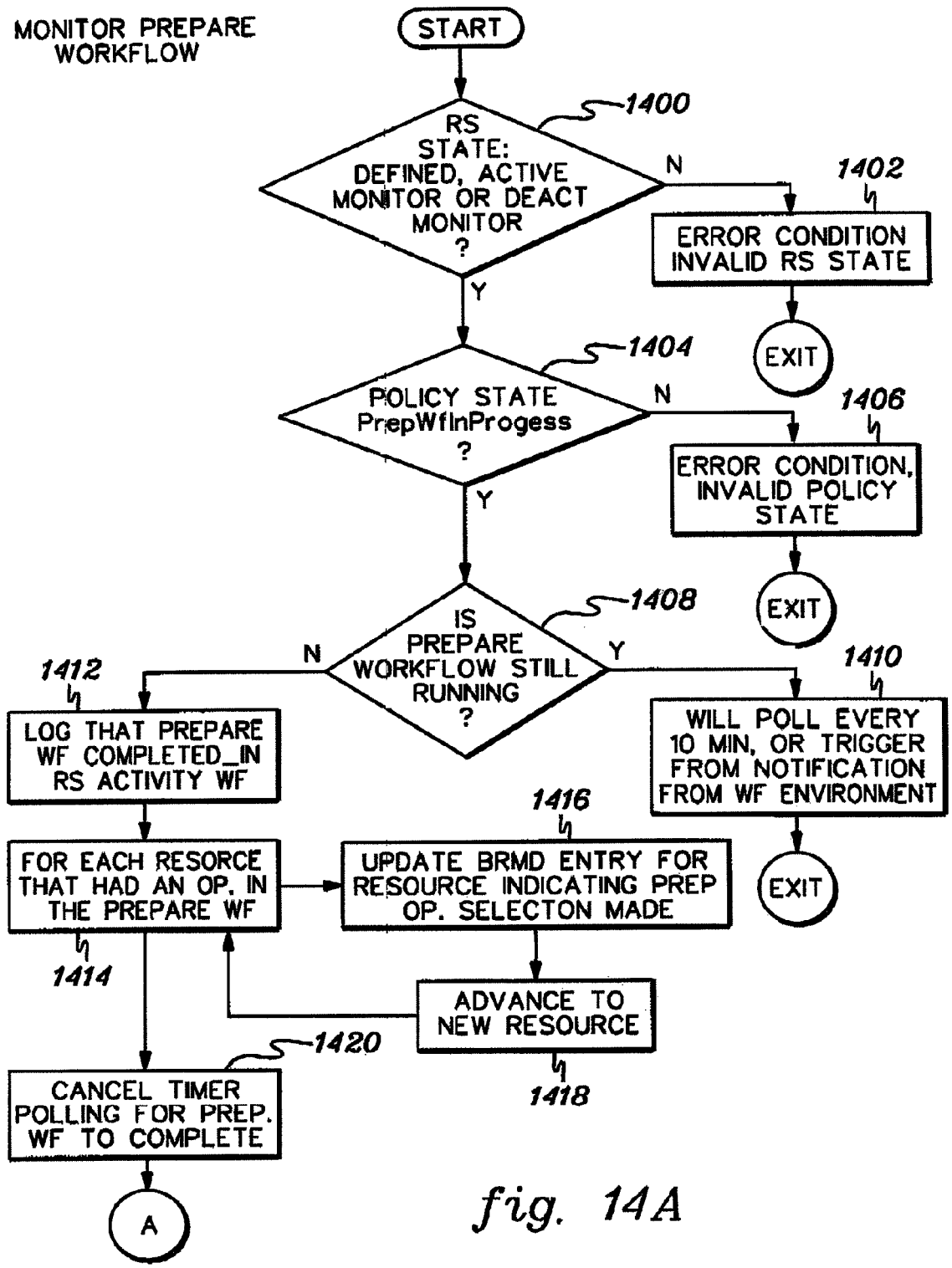
FIGS. 14A-14C depict one embodiment of the logic to monitor a prepare workflow, in accordance with an aspect of the present invention.

Referring to FIG. 14A, initially, the RS state is checked to ensure it is one of {Defined, ActiveMonitor, or DeactMonitor}, INQUIRY 1400. If not, there is an error generated, STEP 1402, and processing exits. If the RS state is one of the acceptable states, then the policy state is checked to determine if it is in PrepWFInProgress state, INQUIRY 1404. If not, an error condition is generated, STEP 1406, and processing exits. If the policy state is in PrepWFInProgress, then the prepare workflow is checked to determine if it has returned a completion code, INQUIRY 1408.

If it is still running, the system polls every, for instance, 10 minutes, and also accepts notification from the workflow environment for completion, STEP 1410. Processing exits. In other implementations, polling frequency can be adjusted, or the system can be implemented to not poll for prepare workflow completion, but to schedule processing once notification of completion is received.

Returning to INQUIRY 1408, if the prepare workflow is not still running, then the RS Activity log is updated with the completion status, STEP 1412. Then, for each resource that had an operation in the prepare workflow, STEP 1414, the BRMD entry for the resource is updated indicating that the prepare operation selection has been made, STEP 1416, and processing advances to the next resource, STEP 1418, until all resources in the prepare workflow have been processed. Then, the timer for the polling for prepare workflow completion is cancelled, STEP 1420.

Figure 14B:
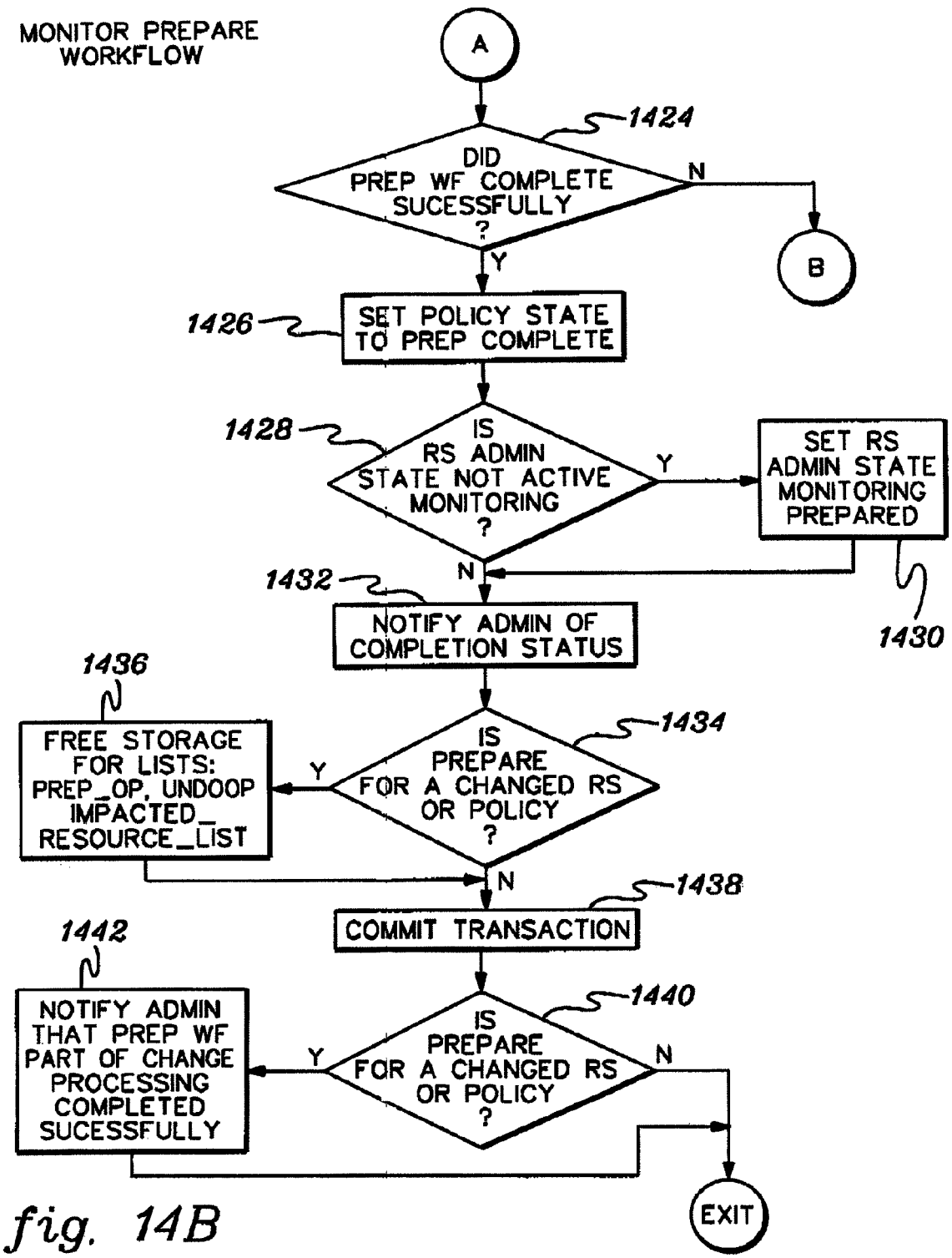
Figure 14C:
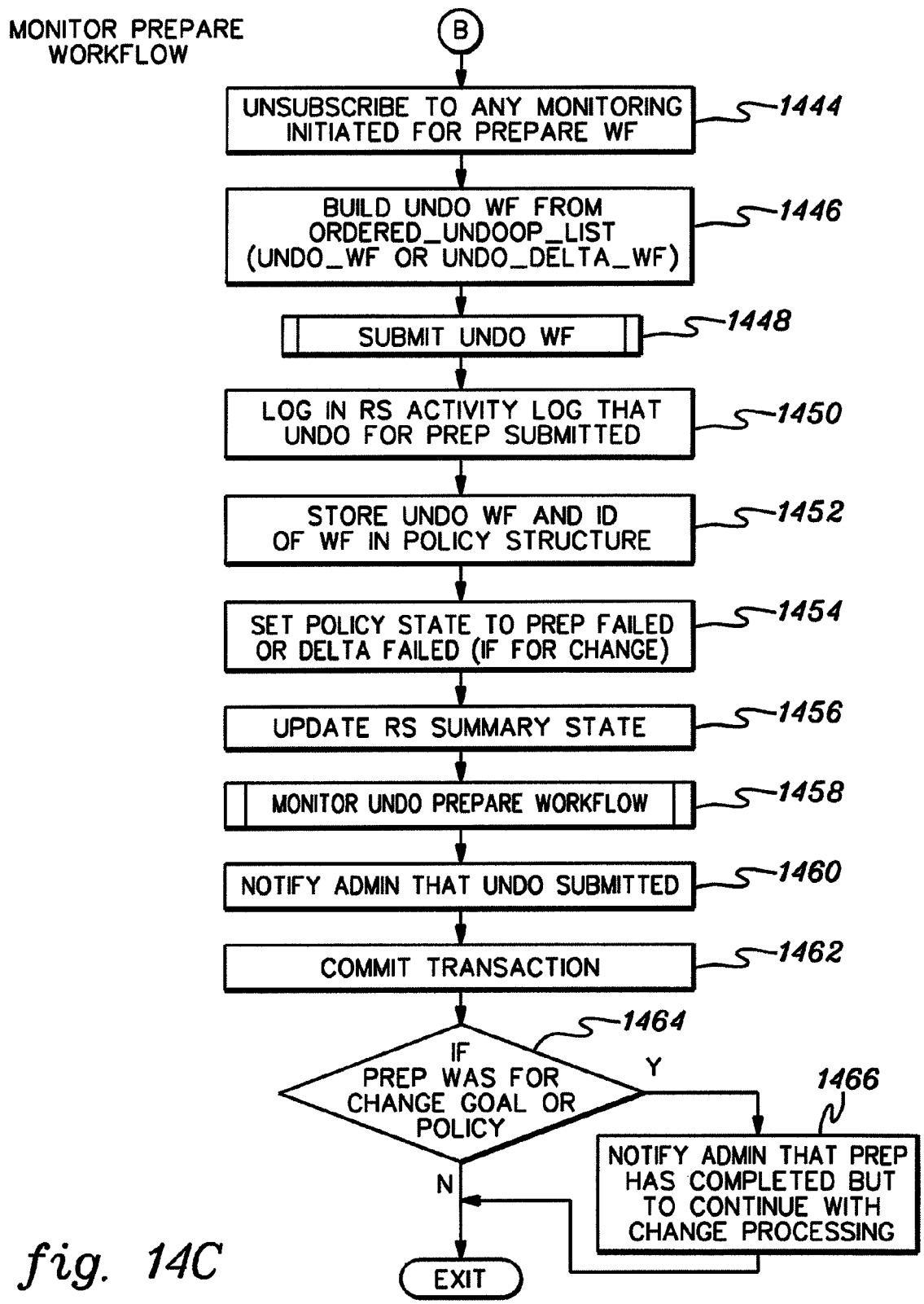

Next, the prepare workflow completion is tested to determine whether it completed successfully, INQUIRY 1424 (FIG. 14B). If there was a successful completion, the policy state is set to PrepComplete, STEP 1426. If the RS state was not 'ActiveMonitoring', INQUIRY 1428, meaning that the RS was either in a Defined or DeactMonitor state, then the RS state is adjusted to be MonitoringPrepared, STEP 1430. Thereafter, or if the state is ActiveMonitoring, the admin is notified of the completion status, STEP 1432. Next, a determination is made as to whether the prepare was for a change of RS or change of policy, INQUIRY 1434. If the prepare was for a change, then the storage for the following lists is released: prep_op, undoop, and impacted_resource_list, STEP 1436. Thereafter, or if the prepare was not for a change, the prepare transaction is committed, STEP 1438. If the processing is for change of RS scope or goal, INQUIRY 1440, the admin is notified that the prepare workflow part of the processing has completed, and that the rest of change RS scope or goal processing can continue, STEP 1442. Thereafter, or if the prepare is not for a change, processing exits.

Returning to INQUIRY 1424, if the prepare workflow completion is tested to be unsuccessful, then processing continues to STEP 1444 (FIG. 14C), where the resources in the prep workflow that were registered (or subscribed to) for monitoring are unregistered. Next, an undo workflow is built using the ordered_undoop_list found in the policy structure, STEP 1446. In one implementation, the ordered_undoop_list is built at the time of validation of policy, generating the prepare workflow operations and ordering of the operations to include dependencies. The list of undo operations is formed so that when executed the IT environment can be returned to a consistent state as it was before initiation of the preparatory workflow. Undo operations are formed at the time the preparatory operations are selected as pairings and run time state of the IT environment may change subsequently resulting in a different selection of preparatory and associated undo operations. Therefore, selection of both preparatory and undo operations is done at a single point in time and on a consistent IT environment. The undo workflow can be either one to compensate for the failure of either a new prepare or for a prepare resulting from change of RS scope or goal. Next, the undo workflow is submitted, STEP 1448, using the logic described above in Options for Initiating Preparatory Actions. Then, the RS Activity log is updated to indicate that the undo has been submitted, STEP 1450, and the undo workflow and id are stored in the policy structure, STEP 1452. Further, the policy state is set to PrepFailed or DeltaFailed, STEP 1454, depending on if the original prepare was for a new environment or for change of RS scope or goal. Next, the RS summary state is updated to indicate that the environment is changed, STEP 1456. Then, the processing to monitor the undo prepare workflow is initiated, STEP 1458. The admin is notified that the undo is submitted, STEP 1460, and the transaction to process the completion of the preparatory workflow is committed, STEP 1462. If the prepare was for a change of RS or goal, INQUIRY 1464, then the admin is notified that the original prepare completed but failed, and that the next steps for change processing are to handle the failure of the prepare of the delta workflow, STEP 1466. Thereafter, or if the prepare was not for a change, processing then exits.

Monitoring of Environment for Maintaining Prepared State

Resources on which preparatory operations are performed are observed for changes in state or changes in property/value pairs that may indicate a change in the intent of the preparatory operation. Monitoring is invoked from prepare policy, as an example. Resources having operations in the preparatory workflow are subscribed to for notification for changes impacting the intent of the preparatory workflow. Should a failure occur which forces discontinuation of support for the intent of the preparatory operation, the policy associated with the RS transitions to a "validated" state from a "prepared" state indicating execution of the preparatory workflow is required. No "undo" of changes made by the preparatory workflow are undertaken, if the preparatory workflow had completed normally.

One embodiment of the logic for monitoring of resources for maintaining the prepared state is described with reference to FIG. 15. As one example, the RS performs this logic.

Figure 15:
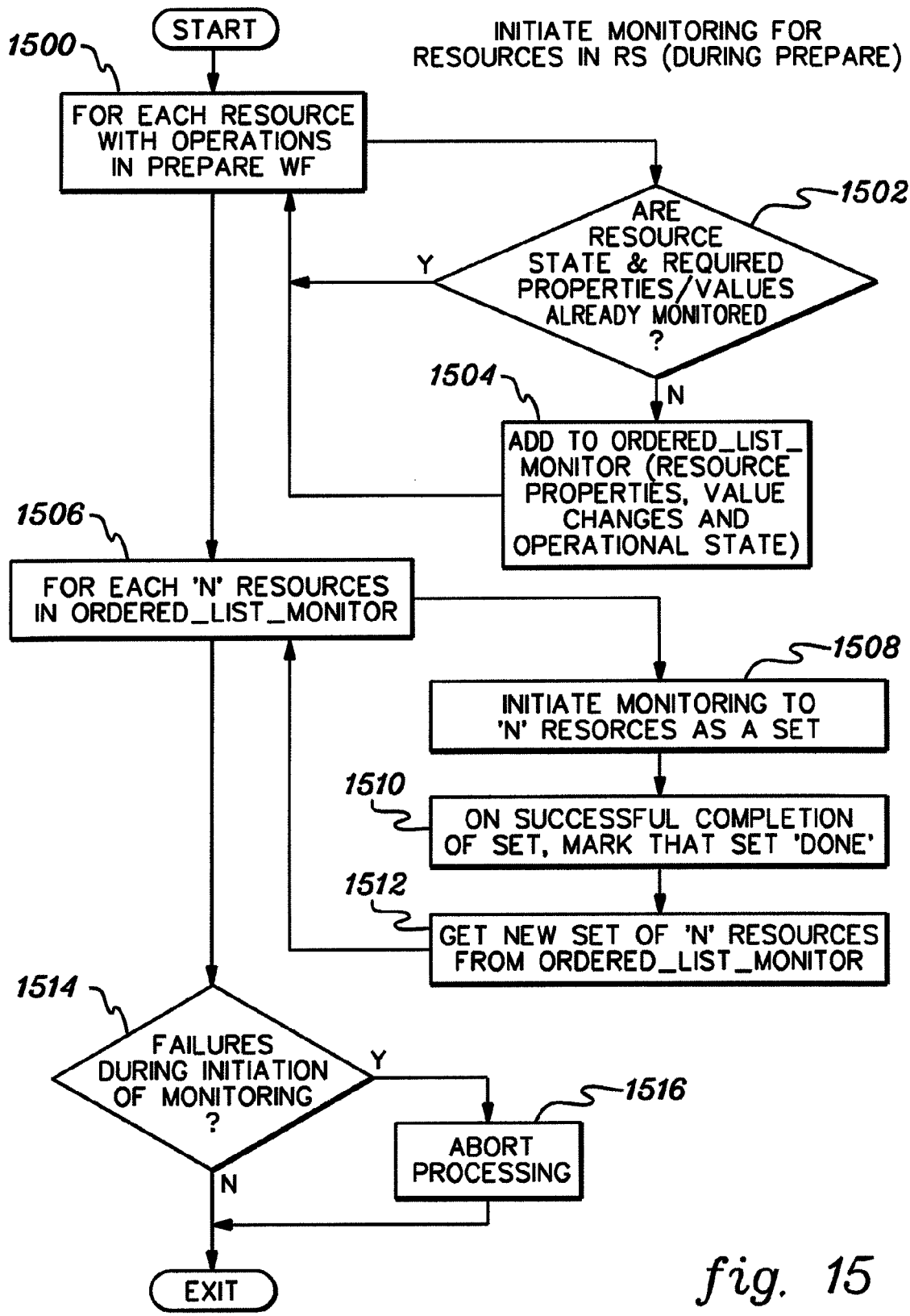
FIG. 15 depicts one embodiment of the logic to initiate monitoring for resources during prepare, in accordance with an aspect of the present invention.

Referring to FIG. 15, for each resource that has operations in the prepared workflow, STEP 1500, an assessment is made to test whether the state, required properties and associated values of the resources are already being monitored, INQUIRY 1502. If so, processing advances to the subsequent resource, STEP 1500. If not, then the resource, its operational state, and the specific properties of the resources to be monitored are added to the ordered_list_monitor, STEP 1504. Processing then continues to the next resource, STEP 1500.

After all resources are processed as to whether or not monitoring needs to be initiated, monitoring is initiated for these resources in multiple sets. In other implementations, the monitoring can be initiated one resource at a time, or batched differently. For each of a number 'n' set of resources, the monitoring is initiated. The number 'n' can vary, or it can be set to a fixed number, or the total set can be divided into equal batches, STEP 1506. For the batch being processed, the monitoring is initiated, STEP 1508. The monitoring of resources can be initiated a number of ways. For example, through resource specific interfaces, through interfaces provided by monitoring products, or through standards based interfaces. On successful completion of initiating monitoring, the set submitted for monitoring is marked done, STEP 1510. The next set of 'n' resources is obtained, STEP 1512, and the loop continues to process each set of resources until complete. Then, if there are any failures in initiating monitoring for any of the resource sets, INQUIRY 1514, the processing is aborted, STEP 1516, and processing exits. If monitoring was successfully initiated for all resources, the processing exits. One optimization is to stop initiating monitoring for any resources once there is an error, and immediately abort processing.

Once monitoring for resources to remain in the prepared state has been initiated, events received are evaluated as to whether they are being generated as a result of a resource property changing from its value when prepared to a different value. In one implementation, the policy state is changed back to Validated, and out of PrepComplete state. In addition, coordination with the ending of the prepare workflow and submission of undo workflows can occur. In one implementation, the monitoring for termination of prepare workflow logic described above would need to be altered to detect whether the current state of the prepared resources have changed since the prepare workflow completed. Any failures in prepare processing should not result in submission of the undo workflow, to prevent a potential for an inconsistent environment. The monitoring for resource state and property values, as well as periodically polling for this information, should be stopped for the set of resources in the prepare workflow.

In other implementations, if the resources in a prepare workflow transition out of prepared state, notifications can be generated and individual operations can be suggested to resume the resource back to the prepared state. In another example, polling or monitoring for resource state and property/value change for the resources in the prepare workflow can continue, with logic in the event handling to determine that this policy was already transitioned out of PrepComplete state back to Validated.

Monitor Undo Operation Effect of Preparatory Workflow on Failure

Progress of the undo preparatory workflow submitted in the monitor preparatory workflow is reported to the administrator via, for instance, mailbox delivery. Recording of success or failure of the undo workflow is logged. On successful completion of the undo workflow, the policy is indicated as validated and requiring execution of the preparatory workflow. In one implementation, upon failure of the undo workflow, serialization of preparatory operations and of other BR admin operations on the RS are purposefully left blocked to prevent any other work from rendering the environment inconsistent. In this case, admin intervention to correct the environment is desired. In other implementations, the serialization can be released, depending on the desired level of control the administrator wishes to have on inspecting the state of the system before routine work continues.

When an undo preparatory workflow fails to complete normally, serialization of the RS is maintained to block subsequent changes by other preparatory actions or other administrator actions. After manual correction of the environment, the administrator may utilize a service to indicate that repairs have been completed and to remove blocking of subsequent changes to the RS.

One embodiment of the logic to monitor the undo prepare workflow is described with reference to FIGS. 16A-16B. As one example, the RS performs this logic.

Figure 16A:
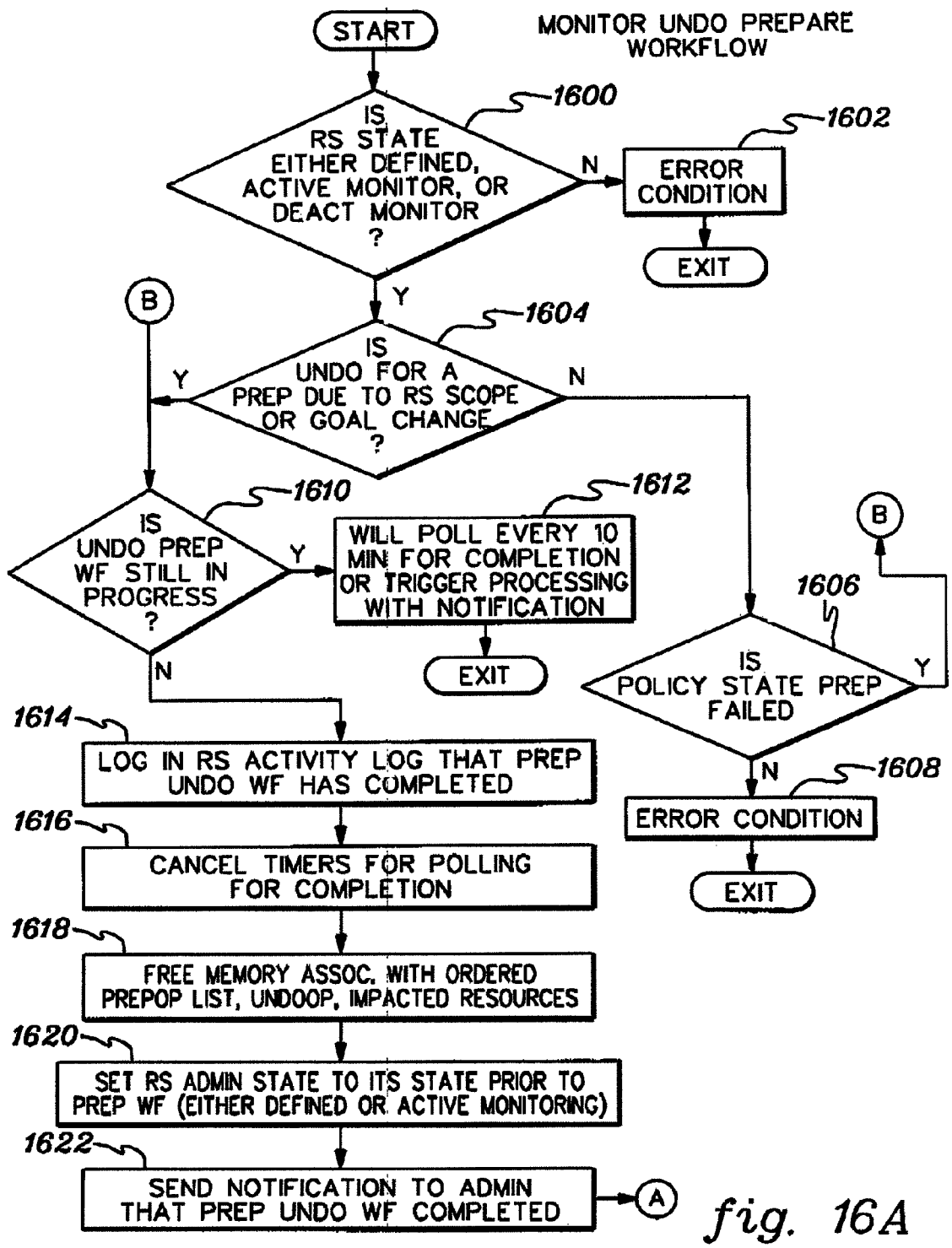
FIGS. 16A-16B depict one embodiment of the logic to monitor the undo of a prepare workflow, in accordance with an aspect of the present invention.
Figure 16B:
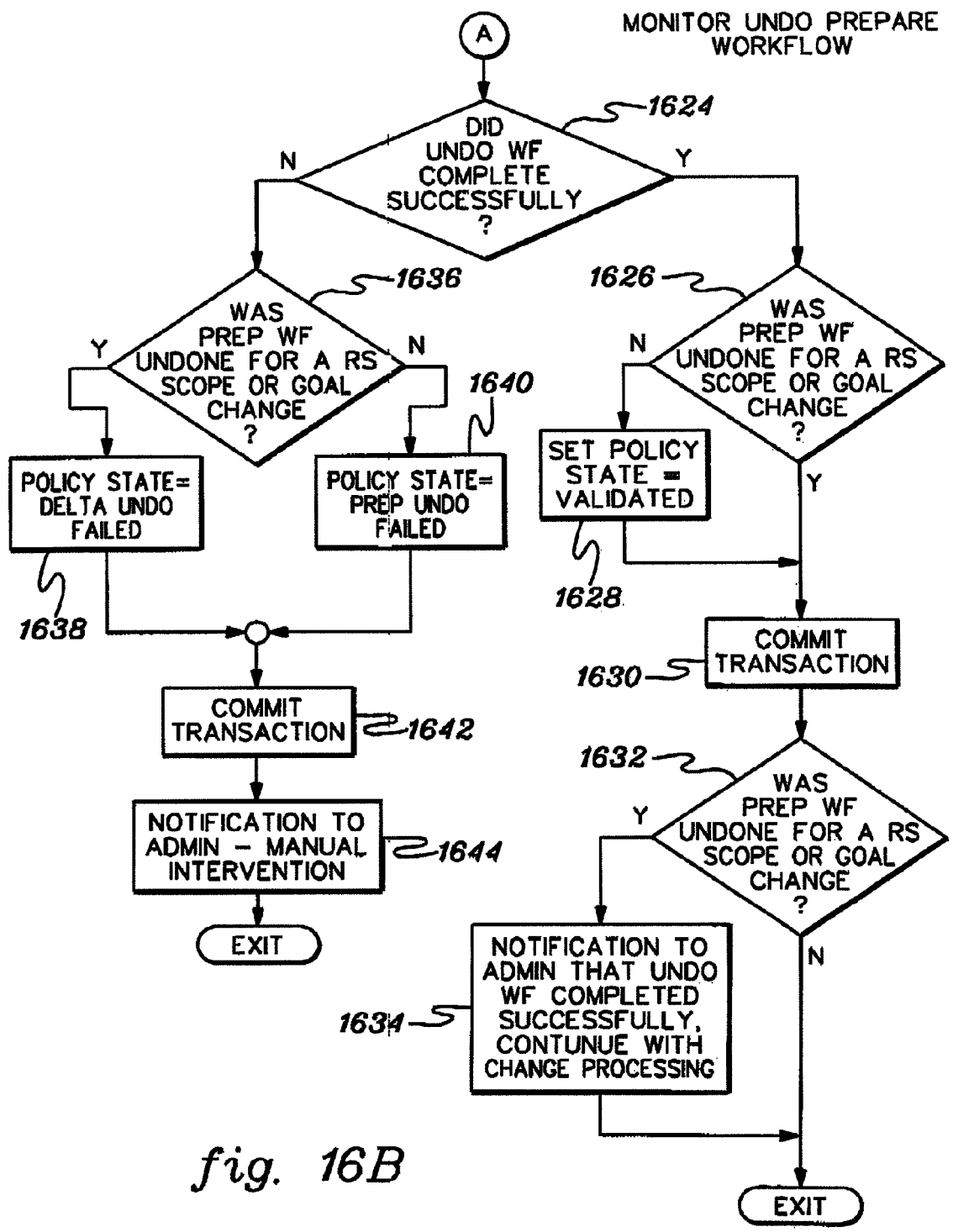

Referring to FIG. 16A, initially, the state of the RS is checked to insure it is in one of {Defined, ActiveMonitor, or DeactMonitor} states, INQUIRY 1600. If not, an error condition is generated, STEP 1602, and processing exits. If it is in one of the acceptable states, a determination is made as to whether the undo is to compensate for a failure on a prepare that was initiated for a change of goal or a change of RS scope, INQUIRY 1604. If that is not the case, then the policy state is checked to insure it is in PrepFailed state, INQUIRY 1606, and if not, an error condition is generated, STEP 1608, and processing exits. If the policy state is PrepFailed, or if the prepare is for a change of goal or RS scope, then the undo prep workflow status is examined to see if it still in progress, INQUIRY 1610. If it is, then in one implementation, the undo prepare workflow is polled every, for instance, 10 minutes, or monitoring is initiated for notification on completion of the workflow to proceed with analysis of the results of the undo workflow, STEP 1612, and processing exits.

If the undo prepare workflow is not still running, INQUIRY 1610, then the completion is logged in the RS activity log, STEP 1614, timers for polling of completion are cancelled, STEP 1616, and any storage associated with ordered prepop list, undoop, and impacted resource list are freed, STEP 1618. Then, the RS admin state is set to its state prior to the initiation of the prepare workflow (one of either Defined or ActiveMonitoring), STEP 1620. Thereafter, notification is sent to the administrator that the prepare undo workflow has completed, STEP 1622.

Next, the completion code from the undo prepare workflow is inspected, INQUIRY 1624 (FIG. 16B), to determine if it completed successfully. If so, and if the undo was not for a prepare related to a change of goal or RS scope, INQUIRY 1626, then the policy state is set to Validated, STEP 1628. Thereafter, or if the undo was for a change, the transaction is committed, STEP 1630.

If the prep workflow was undone for a change of goal or RS scope, INQUIRY 1632, then a notification is sent to the administrator that the undo has completed successfully and that change processing can continue, STEP 1634. Thereafter, or if it was not undone for a change, processing exits.

Returning to INQUIRY 1624, if the determination is that the undo prep workflow completed unsuccessfully, then next a determination is made as to whether the original prepare was for a goal or RS scope change, INQUIRY 1636. If so, then the policy state is set to DeltaUndoFailed, STEP 1638. However, if the original prepare was for a new goal, the policy state is set to PrepUndoFailed, STEP 1640. In both cases, the transaction is committed, STEP 1642, notification is sent to the administrator that manual intervention is required or desired, STEP 1644, and processing exits.

In one implementation, a separate interface is provided to reset the policy and release serialization after any preparatory undo workflow failure. This interface is activated through the administrator's user interface. In other implementations, the interface can be programmatic, or the serialization may be released automatically based on detection of a specific set of IT environment factors.

Modifications to the Prepare Workflow

In some cases, modifying the generated prepare workflow is desired. For example, the administrator may inspect the workflow and determine that additional activities need to be added or removed. In other cases, specific actions may need to be modified or the administrator may want to insert specific interaction with a human at points of the workflow that require authorization. The administrator is presented with a candidate list of actions that can be taken on the prepare workflow to change it, and on selection of a set of changes through an editing interface, the modified workflow is then analyzed for any new dependencies that may need to be considered due to the changes. The following summarizes the set of activities that are performed when customers choose to modify the workflow:

Policy associated with a RS and associated prep wf is retrieved.

Changes in the environment are checked, and if changed, the BR admin is notified.

Alterations to prep wf is restricted, in this example, to adding/removing activities presented as operations on resources or adding a staff operation to the flow.

BR pulls all supported prep operations from resources in the RS as a selection list.

Policy is marked as having a customer modified prep workflow; subsequent changes to the RS are not validated without explicit customer verification of prepared environment.

If other RS scope changes have occurred, a failure on save could occur.

The modified prep wf is processed on return from the BR admin by being flattened into an internal format and run through operation ordering with results being presented back to the customer for acceptance if there were changes.

The operation ordering list is saved.

The preparatory operation and undo operation list are built and saved (if required).

First phase activate list of operations is adjusted (if required).

List of effected resources is modified and saved.

Gantt chart is rebuilt to represent modified preparatory operation sequence.

Preparatory workflow is rebuilt.

One embodiment of the logic to modify a prepare workflow is described with reference to FIGS. 17A-17C. As one example, the RS performs this logic.

Figure 17A:
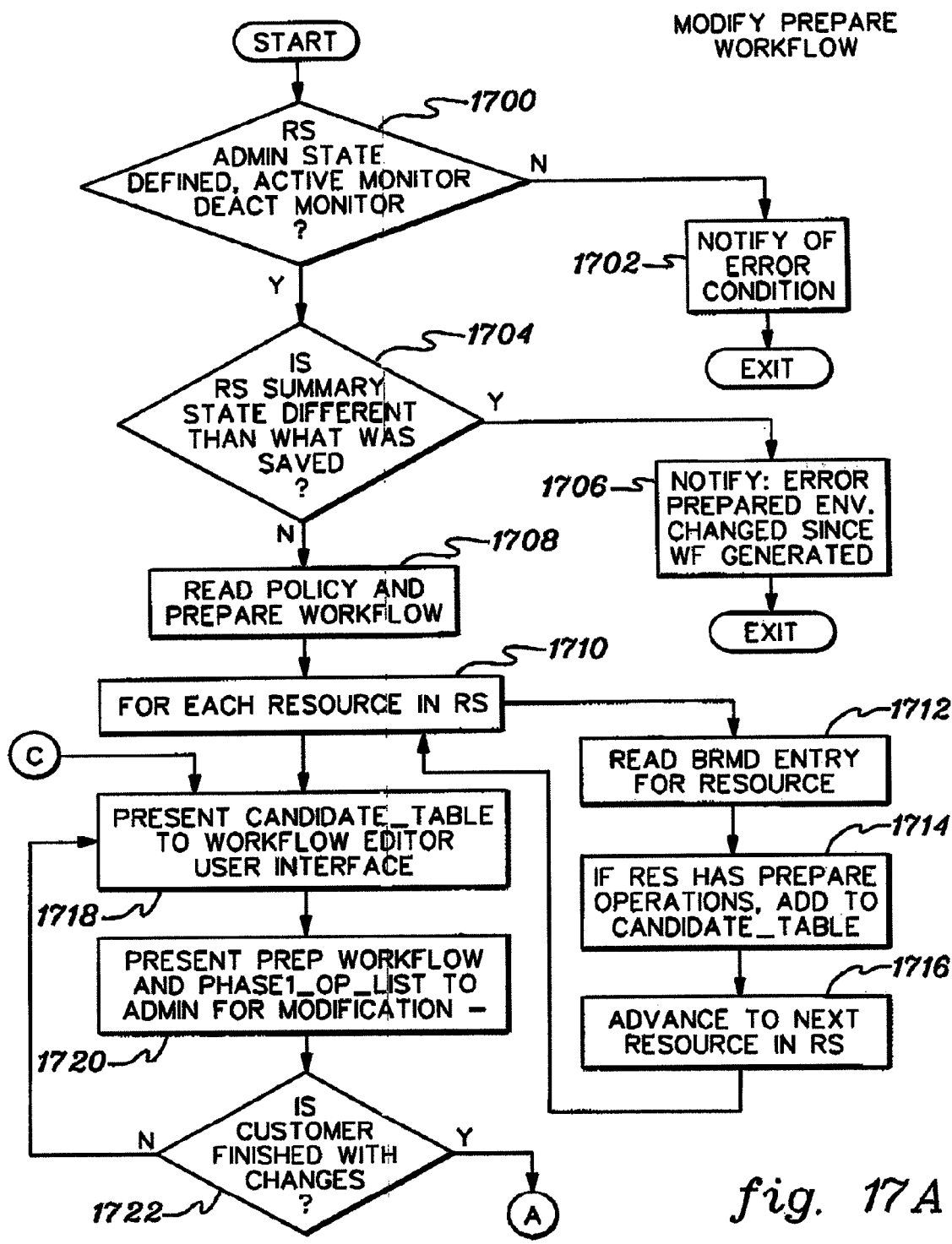
FIGS. 17A-17C depict one embodiment of the logic to modify a prepare workflow, in accordance with an aspect of the present invention.

Referring to FIG. 17A, initially, the RS state is checked to ensure it is one of {Defined, ActiveMonitor, DeactMonitor}, INQUIRY 1700. If not, an error is generated, STEP 1702, and processing exits. If the RS state is one of the above, then the RS summary states from the time of prepare generation to current are compared to ensure that they are the same, INQUIRY 1704. If not, the IT environment has changed since the time of generation of the prepare workflow, and the modifications cannot be made in a consistent manner. As a result, an error condition is generated, STEP 1706, and processing exits. If the RS summary state is the same, then the policy and prepare workflow are read, STEP 1708. For each resource in the RS, STEP 1710, the BRMD entry is read, STEP 1712, and if the resource has a prepare operation available, the resource and operation are added to the candidate_table, STEP 1714. Processing advances to the next resource in the RS, STEP 1716, and continues until all resources are analyzed to determine whether prepare operations exist that are candidates for using to modify the prepare workflow.

Then, the candidate_table is presented to the administrator, STEP 1718. In one implementation, the table can be presented through a workflow editor, such as one compliant with BPEL. In other implementations, a simple text editor can be used with drop down lists for the available operations. Next, the original prepare workflow, as well as the phase1_operations_list, are presented to the administrator for modification, STEP 1720. The editing mechanisms can vary, and continue for a period of time determined by the administrator. If the administrator is not finished with the changes, INQUIRY 1722, processing continues in the workflow editor, STEP 1718.

Figure 17B:
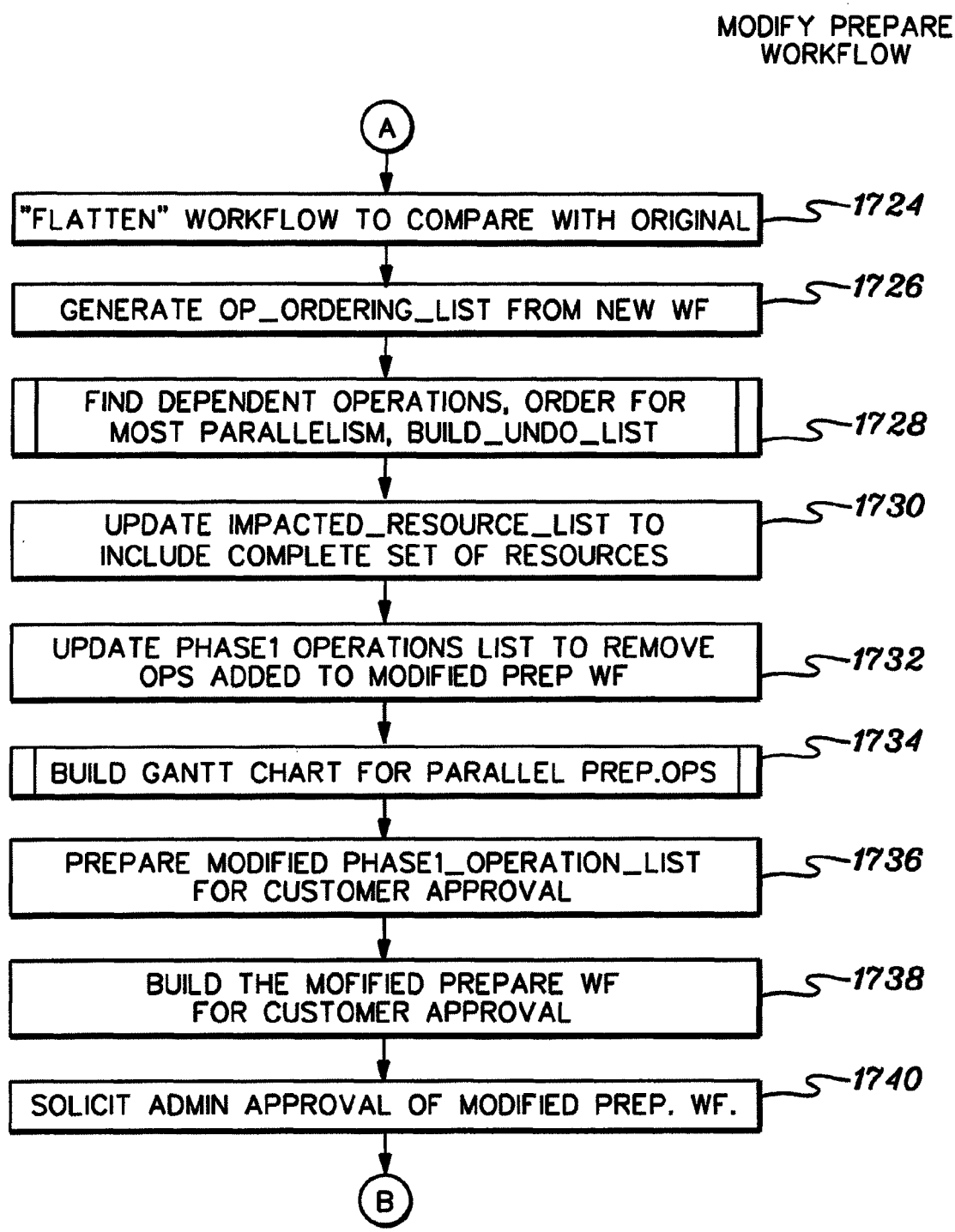
Figure 17C:
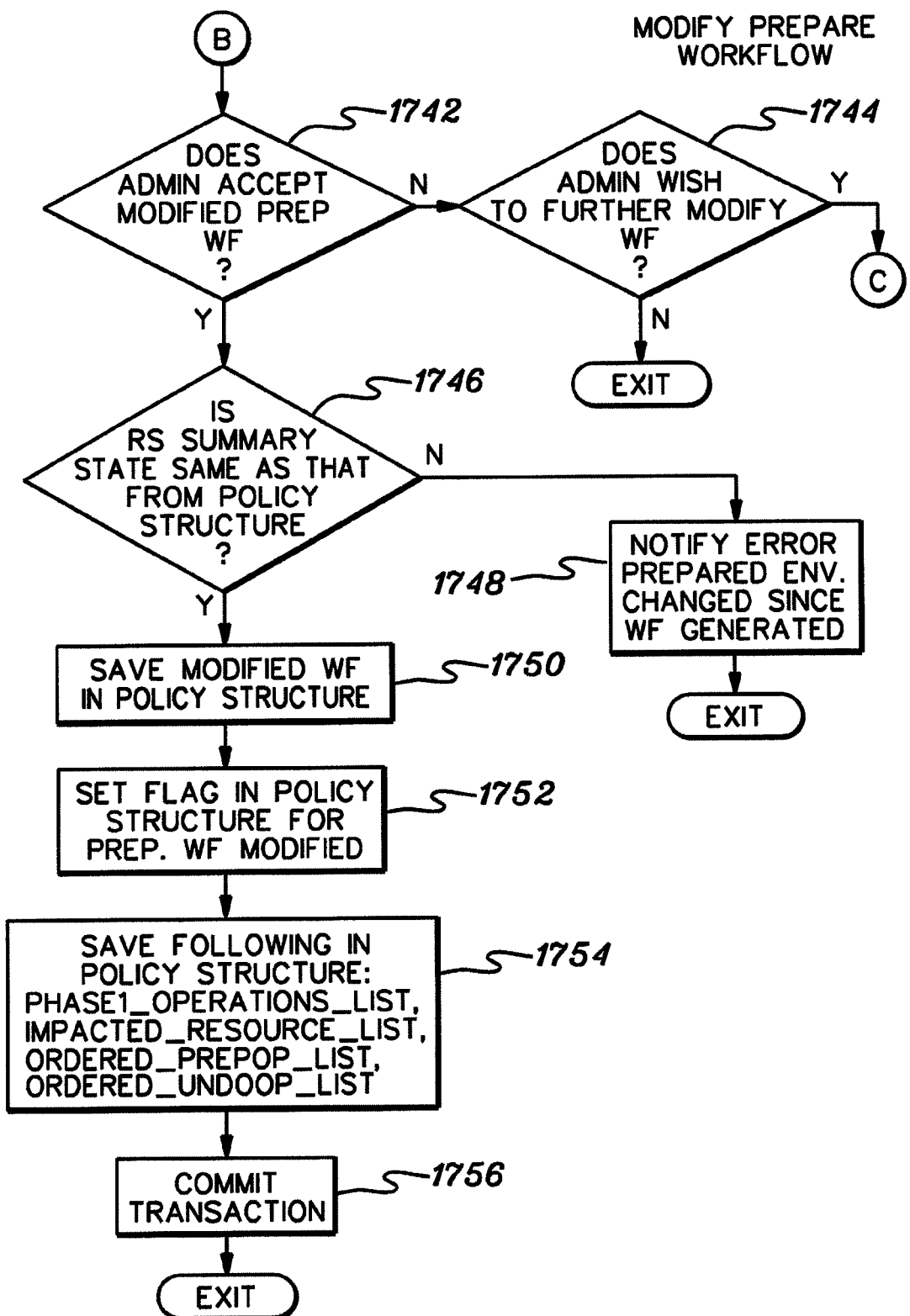

If the administrator is finished with the changes, the workflow is 'flattened' to compare with the original, STEP 1724 (FIG. 17B). The flattening of the workflow is done through assembling the operations in a simple programmatic structure. The flattened list is used to create an operations ordering list, STEP 1726. Next, any operations depended upon by the operations, resources in the modified workflow are determined, STEP 1728. In one implementation, this can be achieved through dependency order operations. In other implementations, the dependency operations could be listed in a file that is processed. Next, the list of resources impacted by the prepare (impacted_resource_list) is updated to include the complete set of resources, STEP 1730. Then, the phase1_operations_list is updated to remove any operations that were added to the modified prepare workflow, STEP 1732. At this point, the flow may optionally reinitiate dependency operation ordering for both the phase1_operations_list and the prepare workflow resulting from the customer modification. In an example implementation, dependency operation ordering is described in a co-filed, US Patent Application entitled "Programmatic Validation in an Information Technology Environment," Bobak et al., (POU920070111US), which is hereby incorporated herein by reference in its entirety. In other implementations, the dependency operations could be listed in a file that is processed.

Next, a Gantt type chart is programmatically built for the parallelization of prepare operations, STEP 1734. In one implementation, this can be done according to the algorithm described in "Programmatic Validation in an Information Technology Environment," Bobak et al., (POU920070111US), which is hereby incorporated herein by reference in its entirety. Both the modified phase1_operations_list, STEP 1736, and the modified prepare workflow, STEP 1738, are readied for presentation to the administrator for approval. The administrator is asked to approve the changes, STEP 1740, and the answer is tested in INQUIRY 1742 (FIG. 17C).

If the administrator does not wish to accept the changes, then the administrator is asked whether there is a need to further modify the prepare workflow, INQUIRY 1744. If so, processing cycles back to STEP 1718 (FIG. 17A).

Returning to INQUIRY 1744 (FIG. 17C), if the administrator does not wish to modify the preparatory workflow again, then processing exits.

If the administrator accepted the modified preparatory workflow, then the RS summary state is checked, INQUIRY 1746, to ensure that the current system environment matches that which was present at time of prepare workflow generation. If the system environments do not match (RS summary states are different), then an error is generated, STEP 1748, and processing exits. If the summary states do match, then the modified workflow is saved in the policy structure, and a flag is set in the policy structure to indicate that the original preparatory workflow that was generated has been modified, STEP 1752. Next, in STEP 1754, the following items are stored into the policy structure, based on the modifications initiated by the administrator: phase1_operations_list, Impacted_Resource_List, ordered_prepop_list, and ordered_undoop_list, as examples. The transaction is then committed, STEP 1756, and processing exits.

Described in detail herein is a capability for programmatically preparing an environment for management.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 18:
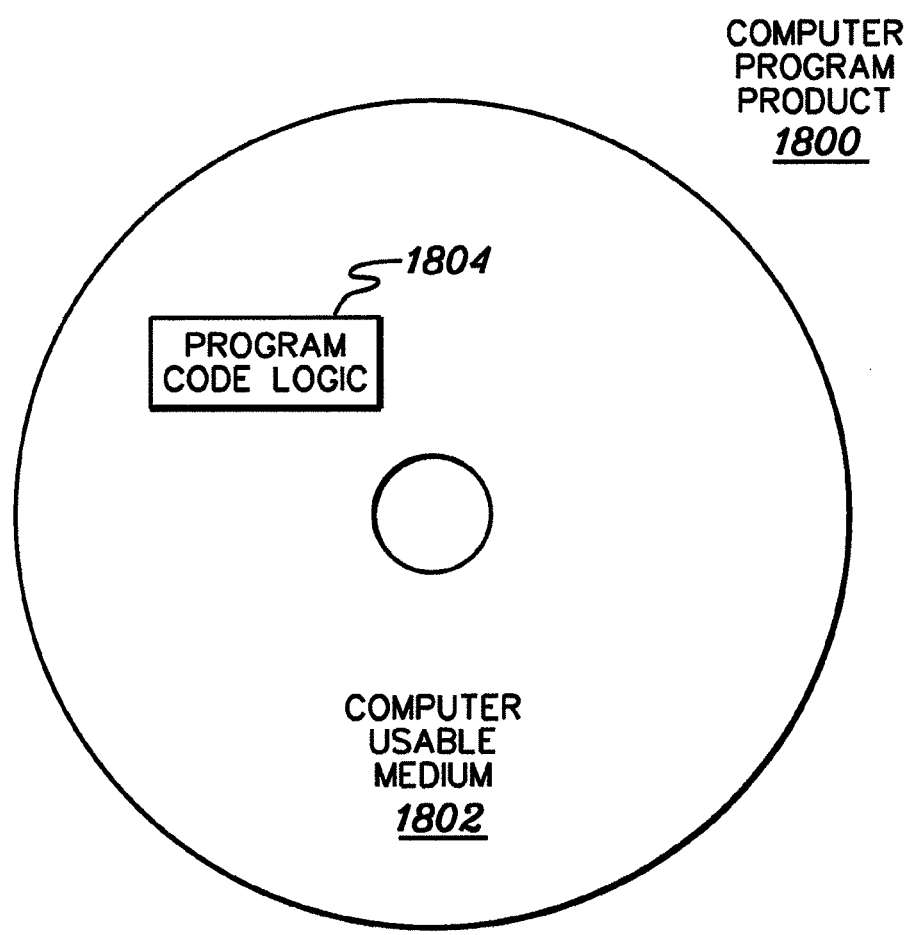
FIG. 18 depicts one embodiment of a computer program product incorporating one or more aspects of the present invention.

One example of an article of manufacture or a computer program product incorporating one or more aspects of the present invention is described with reference to FIG. 18. A computer program product 1800 includes, for instance, one or more computer usable media 1802 to store computer readable program code means or logic 1804 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for dynamically selecting, based on the current state of the environment, preparatory actions to be recommended for an IT environment to be managed. The actions are initiated and monitored, along with the resources of the operations. If a failure occurs, an undo process is performed. Advantageously, the selecting, initiating, and monitoring are performed programmatically.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or J/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating configuration of a computing environment, said method comprising:
    configuring a computing environment to prepare the computing environment to support a management goal of the computing environment, the management goal being a runtime management goal having a specific quantifiable value and comprising an availability goal associated with computing resources of the computing environment, and wherein the configuring is to configure the computing environment to improve functionality of the computing environment by meeting the specified runtime management goal of availability of the computing environment, and wherein the configuring comprises:
    programmatically selecting, by a processor, one or more selected preparatory actions to be recommended for the computing environment to support the runtime management goal of the computing environment, wherein the programmatically selecting comprises:
        selecting one or more computing resources to be processed;
        obtaining from a data structure one or more pairings for the one or more computing resources, wherein a pairing for a resource of the one or more computing resources includes the resource, another resource paired with the resource and one or more specified effects of preparatory actions on at least one of the resource and the another resource, and wherein the pairing is a specific type of pairing;
        choosing from the obtained pairings one or more pairings to be considered in selecting the one or more selected preparatory actions, wherein the choosing eliminates pairings that are not of a prepare type;
        determining from the one or more chosen pairings one or more effects one or more preparatory actions can have on at least one of one or more resources of the computing environment or one or more management operations of the computing environment, wherein the determining an effect a preparatory action can have comprises using information about relationships between resources obtained from predefined pairing information to determine the effect;
    based on the determined one or more effects, choosing at least one preparatory action, the choosing based on whether the runtime management goal can be achieved at preparatory time;
    checking, for a chosen preparatory action, whether the chosen preparatory action is to be used in preparing the computing environment, wherein the checking is based on a comparison of the current real-time state of a resource associated with the chosen preparatory action prior to performing the chosen preparatory action and the state of the resource that results should the chosen preparatory action be performed;
    selecting, based on the checking, one or more preparatory actions to be used in configuring the computing environment to support the runtime management goal, the one or more preparatory actions, selected based on the checking, being the one or more selected preparatory actions; and
    using the selected one or more preparatory actions to configure the computing environment, wherein functionality, including availability, of the computing environment is improved by meeting the specified runtime management goal of availability of the computing environment by satisfying a quantified recovery goal.

2. The computer-implemented method of claim 1, wherein the using comprises initiating at least one preparatory action of the one or more selected preparatory actions to be used in configuring the computing environment.

3. The computer-implemented method of claim 2, further comprising monitoring execution of the at least one initiated preparatory action.

4. The computer-implemented method of claim 2, further comprising monitoring a prepared state of one or more resources associated with the at least one initiated preparatory action.

5. The computer-implemented method of claim 2, further comprising backing out the at least one initiated preparatory action, based on a detected failure.

6. The computer-implemented method of claim 1, further comprising generating a preparatory process to include the one or more selected preparatory actions.

7. The computer-implemented method of claim 6, further comprising modifying the preparatory process.

8. The computer-implemented method of claim 6, wherein the preparatory process comprises a plurality of selected preparatory actions, and wherein said method further comprises splitting the plurality of selected preparatory actions into a set of one or more selected preparatory actions to be performed at prepare time and a set of one or more selected preparatory actions to be performed at another time.

9. The computer-implemented method of claim 8, further comprising ordering at least one of the set of one or more selected preparatory actions to be performed at prepare time or the set of one or more selected preparatory actions to be performed at another time.

10. The computer-implemented method of claim 1, wherein a plurality of selected preparatory actions is selected, and wherein the method further comprises initiating execution of at least two preparatory actions of the plurality of selected preparatory actions in parallel.

11. The computer-implemented method of claim 1, wherein the one or more selected preparatory actions are associated with at least one resource shared across a plurality of business applications.

12. The computer-implemented method of claim 11, wherein each business application of the plurality of business applications has a management goal associated therewith, and wherein conflicting management goals are reconciled such that the shared resource is prepared to support the most stringent management goal of the conflicting management goals.

13. A computer system for facilitating configuration of a computing environment, said computer system comprising:
a memory; and
a processor in communications with the memory, wherein the computer system is configured to perform a method, said method comprising:
configuring a computing environment to prepare the computing environment to support a management goal of the computing environment, the management goal being a runtime management goal having a specific quantifiable value and comprising an availability goal associated with computing resources of the computing environment, and wherein the configuring is to configure the computing environment to improve functionality of the computing environment by meeting the specified runtime management goal of availability of the computing environment, and wherein the configuring comprises:
programmatically selecting one or more selected preparatory actions to be recommended for the computing environment to support the runtime management goal of the computing environment, wherein the programmatically selecting comprises:
selecting one or more computing resources to be processed;
obtaining from a data structure one or more pairings for the one or more computing resources, wherein a pairing for a resource of the one or more computing resources includes the resource, another resource paired with the resource and one or more specified effects of preparatory actions on at least one of the resource and the another resource, and wherein the pairing is a specific type of pairing;
choosing from the obtained pairings one or more pairings to be considered in selecting the one or more selected preparatory actions, wherein the choosing eliminates pairings that are not of a prepare type;
determining from the one or more chosen pairings one or more effects one or more preparatory actions can have on at least one of one or more resources of the computing environment or one or more management operations of the computing environment, wherein the determining an effect a preparatory action can have comprises using information about relationships between resources obtained from predefined pairing information to determine the effect;
based on the determined one or more effects, choosing at least one preparatory action, the choosing based on whether the runtime management goal can be achieved at preparatory time;
checking, for a chosen preparatory action, whether the chosen preparatory action is to be used in preparing the computing environment, wherein the checking is based on a comparison of the current real-time state of a resource associated with the chosen preparatory action prior to performing the chosen preparatory action and the state of the resource that results should the chosen preparatory action be performed;
selecting, based on the checking, one or more preparatory actions to be used in configuring the computing environment to support the runtime management goal, the one or more preparatory actions, selected based on the checking, being the one or more selected preparatory actions; and
using the selected one or more preparatory actions to configure the computing environment, wherein functionality, including availability, of the computing environment is improved by meeting the specified runtime management goal of availability of the computing environment by satisfying a quantified recovery goal.

14. The computer system of claim 13, wherein the one or more selected preparatory actions are associated with at least one resource shared across a plurality of business applications.

15. A computer program product for facilitating configuration of a computing environment, said computer program product comprising:
a non-transitory computer readable storage medium readable by a processing circuit and storing instructions for execution by the processing circuit for performing a method comprising:
configuring a computing environment to prepare the computing environment to support a management goal of the computing environment, the management goal being a runtime management goal having a specific quantifiable value and comprising an availability goal associated with computing resources of the computing environment, and wherein the configuring is to configure the computing environment to improve functionality of the computing environment by meeting the specified runtime management goal of availability of the computing environment, and wherein the configuring comprises:

programmatically selecting, by a processor, one or more selected preparatory actions to be recommended for the computing environment to support the runtime management goal of the computing environment, wherein the programmatically selecting comprises:

selecting one or more computing resources to be processed;

obtaining from a data structure one or more pairings for the one or more computing resources, wherein a pairing for a resource of the one or more computing resources includes the resource, another resource paired with the resource and one or more specified effects of preparatory actions on at least one of the resource and the another resource, and wherein the pairing is a specific type of pairing;

choosing from the obtained pairings one or more pairings to be considered in selecting the one or more selected preparatory actions, wherein the choosing eliminates pairings that are not of a prepare type;

determining from the one or more chosen pairings one or more effects one or more preparatory actions can have on at least one of one or more resources of the computing environment or one or more management operations of the computing environment, wherein the determining an effect a preparatory action can have comprises using information about relationships between resources obtained from predefined pairing information to determine the effect;

based on the determined one or more effects, choosing at least one preparatory action, the choosing based on whether the runtime management goal can be achieved at preparatory time;

checking, for a chosen preparatory action, whether the chosen preparatory action is to be used in preparing the computing environment, wherein the checking is based on a comparison of the current real-time state of a resource associated with the chosen preparatory action prior to performing the chosen preparatory action and the state of the resource that results should the chosen preparatory action be performed;

selecting, based on the checking, one or more preparatory actions to be used in configuring the computing environment to support the runtime management goal, the one or more preparatory actions, selected based on the checking, being the one or more selected preparatory actions; and using the selected one or more preparatory actions to configure the computing environment, wherein functionality, including availability, of the computing environment is improved by meeting the specified runtime management goal of availability of the computing environment by satisfying a quantified recovery goal.

16. The computer program product of claim 15, wherein the one or more selected preparatory actions are associated with at least one resource shared across a plurality of business applications, each business application of the plurality of business applications having a management goal associated therewith, and wherein conflicting management goals are reconciled such that the shared resource is prepared to support the most stringent management goal of the conflicting management goals.

17. The computer program product of claim 15, wherein the method further comprises generating a preparatory process to include a plurality of selected preparatory actions, wherein the plurality of selected preparatory actions are split into a set of one or more selected preparatory actions to be performed at prepare time and a set of one or more selected preparatory actions to be performed at another time.

18. The computer program product of claim 17, wherein the method further comprises ordering at least one of the set of one or more selected preparatory actions to be performed at prepare time or the set of one or more selected preparatory actions to be performed at another time.

19. The computer program product of claim 15, wherein the using comprises initiating at least one preparatory action of the one or more selected preparatory actions to be used in configuring the computing environment; and wherein the method further comprises:

monitoring execution of the at least one initiated preparatory action; and monitoring a prepared state of one or more resources associated with the at least one initiated preparatory action.

20. The computer program product of claim 19, wherein the method further comprises backing out the at least one initiated preparatory action, based on a detected failure.

* * * * *